United States Patent [19]
Lorenz et al.

[11] Patent Number: 5,334,923
[45] Date of Patent: Aug. 2, 1994

[54] MOTOR TORQUE CONTROL METHOD AND APPARATUS

[75] Inventors: Robert D. Lorenz, Madison, Wis.;
Kam T. Hung, Wanchai, Hong Kong;
Thomas A. Lipo, Madison, Wis.; Julio C. Moreira, Benton Harbor, Mich.

[73] Assignee: Wisconsin Alumni Research Foundation, Madison, Wis.

[21] Appl. No.: 858,172

[22] Filed: Mar. 27, 1992

Related U.S. Application Data

[63] Continuation-in-part of Ser. No. 591,517, Oct. 1, 1990.

[51] Int. Cl.$^5$ .............................................. H02P 5/40
[52] U.S. Cl. ..................................... 318/805; 318/807
[58] Field of Search ............... 318/807, 800, 803, 805, 318/811, 808, 798, 806; 187/29 R

[56] References Cited

U.S. PATENT DOCUMENTS

| | | |
|---|---|---|
| 4,023,083 | 5/1977 | Plunkett . |
| 4,112,339 | 9/1978 | Lipo . |
| 4,245,181 | 1/1981 | Plunkett . |
| 4,280,085 | 7/1981 | Cutler et al. . |
| 4,418,308 | 11/1983 | Bose ............................... 318/808 |
| 4,431,957 | 2/1984 | Chausse et al. . |
| 4,441,064 | 4/1984 | Cutler et al. . |
| 4,445,080 | 4/1984 | Curtiss . |
| 4,450,398 | 5/1984 | Bose . |
| 4,451,770 | 5/1984 | Boettner et al. . |
| 4,503,377 | 3/1985 | Kitabayachi et al. . |
| 4,573,003 | 2/1986 | Lipo . |
| 4,585,982 | 4/1986 | Cooper et al. . |
| 4,623,042 | 11/1986 | Kamaike ........................ 187/29 R |
| 4,724,373 | 2/1988 | Lipo . |
| 4,780,650 | 10/1988 | Miyazaki et al. ................ 318/798 |
| 4,912,378 | 3/1990 | Vukosavic . |
| 4,968,925 | 11/1990 | DeDonker ....................... 318/805 |
| 5,144,216 | 9/1992 | DeDonker ....................... 318/807 |

OTHER PUBLICATIONS

Moreira et al., *A New Method for Rotor Time Constant Tuning in Indirect Field Oriented Control*, IEEE Power Electronics Specialists Conference 1991, 573-580, Jun. 1990.

Moreira et al., *Low Cost Efficiency Maximizer for an Induction Motor Drive*, IEEE Industry Applications Society Annual Meeting, 426-431, Oct. 1989.

Moreira et al., *Direct Field Orientation Control Using the Third Harmonic Component of the Stator Voltage*, International Conference on Electrical Machines Proceedings, 1237-1242, Aug. 1990.

Moreira et al., *Modeling of Saturated AC Machines Including Air Gap Flux Harmonic Components*, IEEE Industry Applications Society Annual Meeting, 37-44, Oct. 1990.

K. T. Hung, *A Slip Gain Error Model–Based Correction Scheme of Near–Deadbeat Response for Indirect Field Orientation*, Master's Thesis, 1990.

*A Rotor Flux Error-Based, Adaptive Tuning Approach for Feedforwrad Field Oriented Induction Machine Drives*, IEEE Industry Applications Society Annual Meeting, Oct. 1990.

Julio T, Moreira *A Study of Saturation Harmonic With Applications In Induction Motor Drives* Partial Fulfillment of Doctorate requirements, 1990.

Primary Examiner—William M. Shoop, Jr.
Assistant Examiner—John W. Cabeca
Attorney, Agent, or Firm—Olson & Hierl, Ltd.

[57] ABSTRACT

A method and apparatus for controlling torque by correcting slip gain error in an operating induction motor is provided. This is accomplished by measuring the amplitude and position of a flux in the motor such as rotor flux. Rotor flux position and amplitude can be estimated from the air gap flux. The slip gain can then be corrected in a single step or a few steps to provide a deadbeat control.

8 Claims, 9 Drawing Sheets

5,334,923

MOTOR TORQUE CONTROL METHOD AND APPARATUS

RELATED APPLICATION

This application is a continuation-in-part of U.S. patent application Ser. No. 591,517 filed Oct. 1, 1990.

FIELD OF THE INVENTION

The invention relates to methods and apparatus for using a flux determination to control the torque of a motor.

BACKGROUND OF THE INVENTION

Certain rotor flux field measurement techniques have been used in an attempt to provide motor control which is similar to that of the dc machine by controlling the stator current and frequency at the same time. However, problems still exist in practical implementation of the control algorithm. Rotor flux field orientation requires knowledge of the rotor flux position. This position can be computed by measuring or estimating the rotor flux, but it is not generally practical to modify the machine to install the flux sensors.

To solve this problem, an approach was developed to estimate the magnitude of the rotor flux using terminal voltages and currents. However, this approach had difficulties at low speed and special attention was required due to the nature of the voltage signals. One example of this is U.S. Pat. No. 4,445,080 to Curtiss. The Curtiss device makes a measurement of the amplitude or magnitude of the flux and then this is used to regulate the flux. However, this does not give direct torque control but, in fact, is an attempt to regulate the average torque of the motor. Because the Curtiss device only measures the amplitude of the flux, it does not provide for instantaneous torque control but, in effect, operates as a low performance drive control.

Thus, as can be seen, while the Curtiss device does provide for some control of torque, it does not provide for the instantaneous control of torque which is necessary for a high performance drive system. This is because the Curtiss device operates by simple flux regulation.

Another scheme to estimate the rotor flux position uses a measurement of the rotor position. The sum of a calculated slip position and the measured rotor position yields the relative rotor flux position. The required position measurement is easier to obtain and is often already available. This scheme is referred to as indirect field orientation or feedforward field orientation.

While there are certain advantages, the machine parameter dependence in the computation of slip position (velocity) affects the performance of torque response and the efficiency of the drive system. Therefore, an enormous amount of work has been done over the past twenty years to solve this machine parameter dependence problem in indirect field orientation. It was not previously known that the air gap magnetic flux (and, in particular, the peak amplitude of the fundamental component of this flux and its angular position in the air gap as the flux rotates) could be accurately measured on an instantaneous basis by using some other machine characteristic, such as the third harmonic component of the stator phase voltage. Also, it was not previously known that such air gap flux could be used to accomplish slip gain correction.

No simple and reliable technique or apparatus was previously known which, when used in combination with an operating alternating current machine, would reliably and automatically determine the flux peak amplitude and relative position using only a sensed third harmonic component of the stator phase voltage.

Such instantaneously existing information about the peak amplitude and location of a flux such as the air gap flux, would be very useful in control devices and methods for regulating alternating current motor variables. Moreover, such control devices would themselves also be new and very useful, as would be the methods associated with their operation and use.

Electric motors consume much of the electric power produced in the United States. For example, motors consume about two-thirds of the total U.S. electrical power consumption of about 1.7 trillion kilowatt-hours. Over 50 million motors are estimated to be in use in U.S. industry and commerce with over one million being greater than 5 horsepower (hp). Over 7500 classifications for induction motors exist in the size range of 5 to 500-hp.

Although the efficiency of electrical machinery is improving, the efficiency of the typical squirrel cage induction motor ranges from about 78 to 95 percent for sizes of 1 to 100-hp. Thus, substantial energy savings can still be achieved. Energy can be saved in conventional constant speed applications when load conditions change considerably. Induction motor operation at normal operating conditions can result in high efficiencies by use of a favorable balance between copper and iron losses. Iron losses dominate at light loads. Thus, energy is saved by reducing motor magnetic flux at the expense of increasing copper losses so that an overall loss minimum can be maintained. However, the cost of the controller needed to adjust the motor flux is substantial.

In contrast to constant speed motor systems, variable speed induction motor systems characteristically involve variable torque loads over a range of speeds. Typical applications include compressors, pumps, fans and blowers of the type used in air conditioners, heat pumps, and the like. In these applications, improvement in operating efficiency is possible more economically because a controller for developing the optimum flux condition is derivable from the same converter that is used to vary the speed of the drive.

SUMMARY OF THE INVENTION

The present invention uses a solution which can minimize the dependence of machine parameters on the indirect field oriented drive system so that a robust high performance variable-speed ac drive can be realized.

The present invention is a method and apparatus for regulating the torque of an inductance motor. This is done by first determining the amplitude and position of a given flux of the motor. This can be stator flux, the magnetizing flux, the rotor flux, or any combination of these fluxes. For example, any combination of these fluxes can be arithmetically combined and utilized for the present invention.

A reference amplitude and position for the flux is also provided. A comparison can be made between the determined flux and the reference flux to obtain a correction in slip gain of the motor. The slip gain is the inverse of the rotor time constant. By using this correction in slip gain, the operation of the motor is then adjusted to the desired torque.

Because both the amplitude and position of the flux are measured, a vector quantity is used. This is quite different from the prior art, such as the device taught by Curtiss, which operates using a scaler quantity. Because a vector quantity is used, it is possible to calculate the correction in the slip gain and hence make the appropriate adjustment in the motor in a single step or in few steps. This also provides a robust motor control. Prior art devices, such as taught by Curtiss, require a series of adjustments which eventually attempt to reach the proper torque control.

In its preferred embodiment, the amplitude and position of the rotor flux is measured and it is used to regulate the torque of the motor. As described in more detail below, the amplitude and position of the rotor flux can be determined by measuring the third harmonic voltage and calculating the air gap flux of the motor.

In accordance with this invention, a slip gain error model is provided based on the conventional dq induction machine model equations in a synchronous reference frame. According to the principles of field orientation, it is known that q-axis rotor flux is zero when field orientation is achieved, hence any parameter change will cause a non-zero q-axis rotor flux to exist. If the model includes the nonlinearities of the ac machine, the slip gain corrector should be relatively independent of operating conditions. Such a model can correctly compute the slip gain error within a few correction periods. This is true even when the rotor resistance is suddenly changed to twice its original value. This slip gain error model can also function at start-up as well as at any other operation condition.

However, developing a parameter insensitive scheme to estimate the rotor flux is as important as developing an accurate slip gain error model. Among many possibilities, two systems have been implemented. In the first system, terminal voltages and currents are measured and used to estimate the stator flux, then rotor flux can be estimated based on the stator flux. To further decrease the dependence of machine parameter, a second system was also implemented.

In this second system, the fact that in most induction machines the air gap flux is saturated under normal operation causes a third harmonic voltage to exist in the phase voltage. This third harmonic voltage is measured and the air gap flux calculated and rotor flux reliably estimated. As a result, this system is sensitive to rotor leakage inductance only, hence it allows this system to successfully and accurately operate at zero speed as well as any other speed including slow speeds. Such a system has not been previously provided.

The present invention also provides a method and apparatus for correcting the slip gain error in an operating induction machine by an on-line, feedforward, field-oriented drive. This invention provides a solution to the problem of machine parameter dependence in indirect field orientation by minimizing such dependence so that a robust high performance variable-speed alternating current drive can be realized. The inventive method and apparatus provide advantages of direct and indirect field orientation in one system when used with an indirect field oriented controller. The inventive method and apparatus can be practiced in both the steady state and the transient dynamic state. Because of the predictive nature of the operating point of the inverse model in the correction method and apparatus, convergence time is nearly independent of the operating point and convergence generally occurs in a few correction periods.

In the practice of the present invention, the rotor flux is preferably determined. This can be estimated from measurements of the terminal currents and voltages. However, in the more preferred method, the rotor flux is determined from the air gap flux. The three phase voltages of a stator of a three phase induction motor are summed together. The fundamental voltage components cancel each other out and the resultant wave contains mainly the third harmonic stator voltage components and high frequency components due to interaction between stator and rotor slots in the operating motor. The phase position and amplitude of the third harmonic component of stator voltage is representative of the phase position and amplitude of the air gap flux.

The third harmonic of the air gap flux maintains a constant position with respect to the third harmonic component of the stator voltage and also to the fundamental of air gap flux. The third harmonic component can thus be used to determine the waveform and amplitude of the fundamental flux component or air gap flux.

By comparing the air gap flux with a field oriented reference model, the slip gain error is calculated. Then, by comparing calculated slip gain with calculated slip gain error, an output signal is produced that is employed for regulation of an indirect field oriented controller. Output from the indirect field oriented controller is fed to a current regulated inverter from which regulated phase voltages are fed to a multiphase induction motor or the like. Rotor position information is concurrently also fed to the indirect field oriented controller.

As used, the slip gain $K_r$ refers to the inverse of the rotor time constant $T_r$. As described in more detail below, an estimated value $T_r^*$ of the rotor time can be obtained using the present invention. The present invention uses techniques which are robust and do not require direct measurement of the total rotor inductance and rotor resistance to determine the rotor time constant. Using the techniques of the present invention, the slip gain continues to be set at the proper value even though the true rotor time constant is unknown or changes during the course of motor operation due to factors such as temperature changes or magnetic saturation.

BRIEF DESCRIPTION OF THE DRAWINGS

In the accompanying drawings, which comprise a portion of this disclosure.

DETAILED DESCRIPTION

The present invention is applicable to all alternating current machines. However, for present disclosure purposes, three-phase induction motors are described. For a general discussion of the operation of motors and terms used in the art, see *Electric Machinery* by Fitzgerald et al. (5th ed.) McGraw-Hill, New York (1990) which is incorporated herein by reference. See also parent application Ser. No. 591,517 which is also incorporated herein by reference.

The present invention uses measurements of a motor flux to provide estimations of the rotor time constant $T_r$ or its inverse, the slip gain $K_r$. The resulting slip gain or the difference in correct slip gain, the slip gain error, is then used to control the motor inputs to control torque.

The use of a motor flux provides a high performance control over the torque. By using the combination of both the amplitude and position of the motor flux, a vector analysis can be made and a rather fast control of the torque can be provided. Several motor fluxes can be used including the stator flux, the magnetizing flux and the rotor flux. Preferably, the flux chosen is one which does not change as a function of the temperature over the normal operating range of the motor. As discussed in more detail below, it is preferred to use the rotor flux. The preferred method of determining the rotor flux is by calculation of the air gap flux as discussed in more detail below.

In an induction machine, saturation of the magnetic field paths introduces space saturation harmonic components in the air gap flux due to the non-linear nature of the flux saturation phenomenon. These saturation harmonic components travel in the air gap with the same synchronous speed and direction as the fundamental flux component. Among all these harmonic components, the third is the dominant one. When the three stator phase voltages are summed, the fundamental and characteristic harmonic voltage components are canceled. The resultant waveform contains mainly the third harmonic component modulated by a high frequency component resulting from the air gap flux variations introduced by the rotor slots. The harmonic components of this signal can then be separated and used as a means to locate the machine air gap flux, and, if desired, to measure the rotor mechanical speed.

Figure 1:
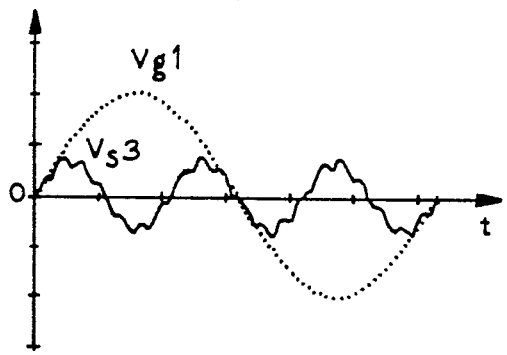
FIG. 1 is a graph showing waveforms of both the fundamental air gap flux voltage $V_{g1}$ and the third harmonic component $V_{g3}$ as modulated by the rotor slot harmonics obtained after the summation of the stator phase voltages.

FIG. 1 illustrates the characteristic relationship between the fundamental air gap voltage $V_{g1}$ and the third harmonic component of the air gap voltage $V_{g3}$ in a three phase alternating current machine obtained after summation of the stator phase voltages. Because no third harmonic currents can circulate in the stator (since the machine is assumed to be wye connected), the air gap third harmonic voltage $V_{g3}$ is identical to the stator third harmonic phase voltage component $V_{s3}$. The third harmonic component is modulated by the rotor slot harmonics.

Figure 2:
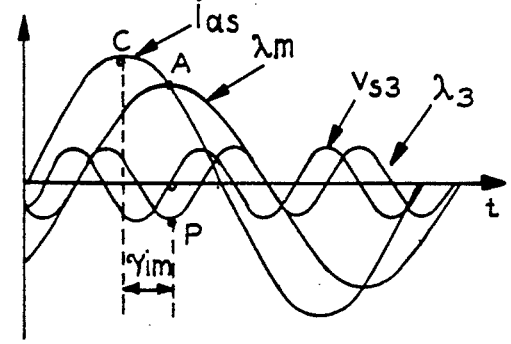
FIG. 2 is a graph showing fundamental components for the phase current $i_{as}$, air gap flux of one phase $\lambda_m$ and third harmonic $V_{s3}$ and also showing the angle of displacement $\gamma_{im}$ between the current and the third harmonic flux component $\lambda_3$.

After eliminating the high frequency component, which is optionally utilized to measure the rotor mechanical speed, and after integration of the third harmonic voltage signal, the third harmonic air gap flux component is obtained as shown in FIG. 2.

The relative position of the fundamental component of the air gap flux in relation to the stator current is obtained by measuring the phase displacement angle between two fixed points in the third harmonic voltage and line current. For example, FIG. 2 shows the interrelation between the fundamental component of the representative stator current for one stator phase shown as $i_{as}$ and the fundamental component of the air gap flux ($\lambda_m$) for the third harmonic component of stator voltage ($V_{s3}$). The third harmonic of flux $\lambda_3$ is obtained by integrating $V_{s3}$. The phase displacement for the stator current and the air gap flux is represented by the angle $\gamma_{im}$. The reference points respectively along the line current ($i_a$) and along the third harmonic voltage signal ($V_{s3}$), are appropriately taken so the $\gamma_{im}$ corresponds to the phase displacement angle between the maximum values of the stator current $i_{as}$ and the air gap flux fundamental component $\lambda_m$.

The position of point P in the third harmonic waveform is known in relation to the terminal current $i_{as}$; and the relative position of this fundamental component of the air gap flux is known with respect to this terminal variable (stator current). Thus, the position of the air gap flux in relation to the terminal current (or voltage) is known at all times if a given point on the third harmonic flux or voltage is located and tracked. The angle of displacement $\gamma_{im}$ between the air gap magnetic flux and the phase current of the stator is measured and used to compute, for example, the torque in a three phase induction machine, or for other purposes, as desired.

Figure 3:
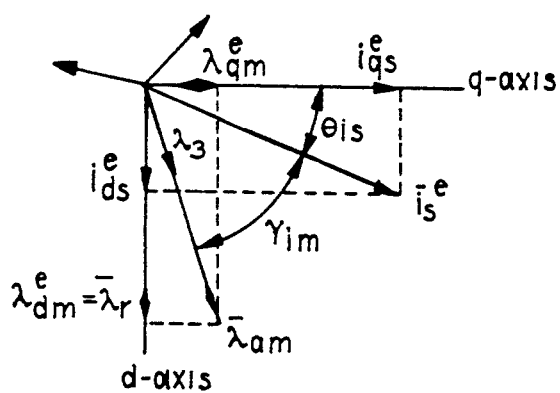
FIG. 3 is a plot showing the interrelationship between stator current air gap flux and third harmonic stator voltage vectors ($v_3$) for one field orientation condition in the synchronous reference frame relative to the d-axis as ordinates and the q-axis as abscissae.

The air gap flux $\lambda_m$ the stator current $\bar{i}_s$, and the third harmonic flux $\bar{\lambda}_3$ are vectorially interrelated as shown in FIG. 3 in the synchronously rotating reference frame representation for a condition of field orientation. It is clear from this vector arrangement that the fundamental of the air gap flux can be resolved into its d-axis and q-axis components $\lambda^e_{dm}$ and $\lambda^e_{qm}$ from a measurement of its magnitude and also the angles $\gamma_{im}$ and $\theta_{is}$.

The d-axis component of the air gap flux, which corresponds to the rotor flux when the machine is field oriented, is then computed as:

$$\lambda_{dm}{}^e = -|\bar{\lambda}_m| \sin(\theta_{is}+\gamma_{im}) = -f_\lambda(|\bar{\lambda}_3|) \sin(\theta_{is}+\gamma_{im}) \quad (1)$$

with $\theta_{is}$ being computed from the prechosen reference values for the stator currents, $i^e_d{}^*_s$ and $i^e_q{}^*_s$ as indicated by:

$$\theta = -\tan^{-1} \frac{i^e_{ds}{}^*}{i^e_{qs}{}^*} \quad (2)$$

The amplitude of the fundamental of the air gap magnetic flux component, $|\bar{\lambda}_m|$ is obtained from the third harmonic air gap component amplitude, via a non-linear function, $f_\lambda$:

$$|\bar{\lambda}_m| = f_\lambda(|\bar{\lambda}_3|) \quad (3)$$

Values for this function are unique to a given machine and these values can be experimentally determined for an unloaded machine, or the like.

Figure 4:
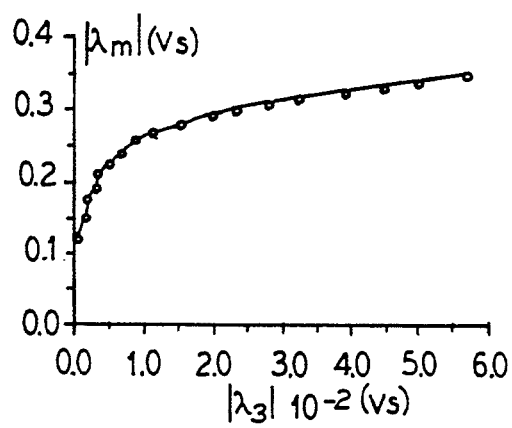
FIG. 4 is a graph showing the relationship between the amplitude of the air gap flux component (plotted as ordinates) and the amplitude of the stator third harmonic voltage (plotted as abscissae in volts) for a 3-hp induction machine.

FIG. 4 shows the experimentally determined relationship for an exemplary three phase induction motor between the amplitude of the fundamental component of the air gap flux and the amplitude of the third harmonic component of the stator phase voltage (or the amplitude of the third harmonic component of the air gap flux). The third harmonic voltage is plotted as abscissae and the fundamental component of the air gap flux is plotted as ordinates for a 3-hp machine. The values represent the amplitude of the third harmonic voltage after the summation of the three stator phase voltages.

The non-linear function $f_\lambda$ is simply a plot of the amplitude of the third harmonic air gap flux linkage, as measured by the method stated, plotted versus the amplitude of the fundamental component of stator flux linkage. This relationship can be obtained by means of a simple no-load test in which the motor is run unloaded at its no-load speed (very near synchronous speed). The fundamental component of stator flux linkage is found by first measuring the amplitude of the fundamental component of the stator line to neutral voltage (a very easy measurement since the applied voltage is simply a sine wave). Secondly, the air gap voltage is calculated by subtracting the stator leakage reactance drop, $I_1 X_{ls}$. Finally, since the flux in an inductor is the integral of voltage, and, since the voltage is sinusoidal, the amplitude of the fundamental component of the air gap flux linkage is simply the amplitude of the air gap voltage divided by the synchronous angular frequency, i.e. the steps are a) $V_{line\text{-}to\text{-}neutral\ (rms)} = V_{line\text{-}to\text{-}line\ (rms)}/\sqrt{3}$ (voltmeter reading)

b) $V_{line\text{-}to\text{-}neutral\ (amplitude)} = \sqrt{2} V_{line\text{-}to\text{-}neutral\ (rms)}$ (since the waveform is sinusoidal)

c) $V_{air\ gap\ (amplitude)} = V_{line\text{-}to\text{-}neutral\ (amplitude)} - X_{ls} I_1$ $_{(amplitude)}$
   $I_1$(amplitude) is the amplitude of the current and $X_{ls}$ is the stator leakage reactance obtained from a locked rotor test (standard test).

d) $\lambda_m = V_{air\ gap\ (amplitude)}/(2\pi)$ e) $\lambda_3$ is the amplitude of the third harmonic flux obtained by measuring the third harmonic voltage obtained by summing the three phase voltages and then dividing by $3(2\pi f)$, (similar to d).

f) This test is repeated over a range of voltages $V_{line\text{-}to\text{-}neutral\ (rms)}$ ranging from zero to 1.3 times the rated line-to-line voltage.

g) A plot of $\lambda_3$ versus $\lambda_m$ can now be plotted.

In particular, the method for indirectly determining air gap flux in an alternating current machine having a stator, a rotor and an air gap therebetween comprises the following steps:

a) measuring the third harmonic component of the stator voltage; and b) calculating the third harmonic component of the air gap flux by integrating the measured third harmonic stator voltage component.

Moreover, the maximum magnitude of the third harmonic component of the air gap magnetic flux can be calculated from the third harmonic component of the air gap flux. From the maximum amplitude of the third harmonic component of the air gap magnetic flux, the maximum magnitude of the fundamental component of the air gap flux is calculated by interpolating the maximum magnitude of the third harmonic component of air gap flux relative to previously measured empirical data characteristic of the machine. From this calculation, values for the function $$\lambda_m = f(v_{s3}) \quad (4)$$

are obtained where $\lambda_m$ is the fundamental component of the air gap flux for a distance of $2\pi$ radians which corresponds to 360° of rotation of the rotor, and $v_{s3}$ is the third harmonic component of the stator voltage for the distance of $2\pi$ radians which corresponds to 360° of rotation of the rotor.

The previously measured empirical data is obtained by preliminarily establishing for the machine the quantitative relationship between the maximum amplitude of the third harmonic component of the stator voltage at rated line voltage for the machine and with the machine operating under no mechanical load. The rotation speed of the rotor can be computed from higher harmonic components associated with the third harmonic component of the stator voltage.

According to the method, a representative stator current can be measured concurrently with the measuring of the third harmonic component of the stator voltage; and the stator current can then be compared with the calculated third harmonic component of the air gap magnetic flux to determine the phase angle therebetween.

Figure 5:
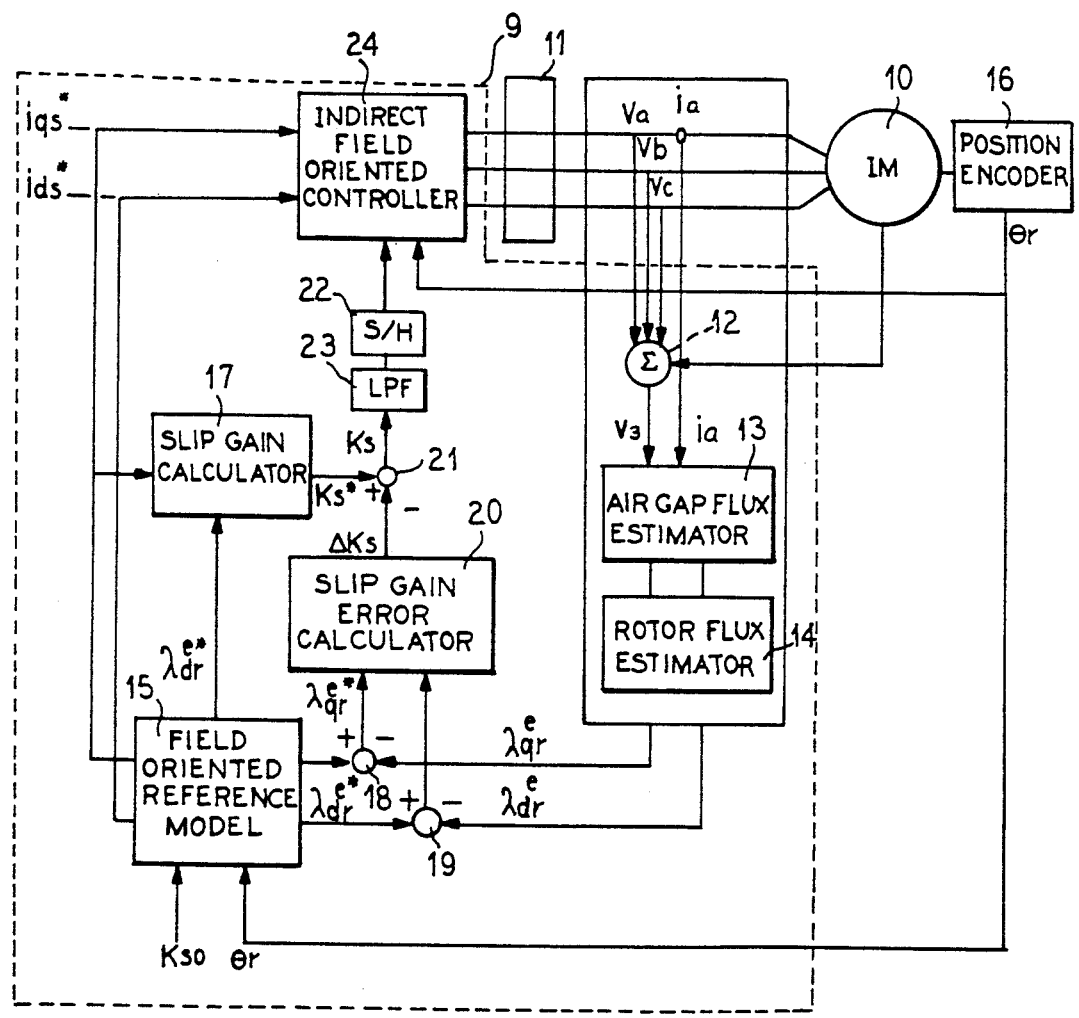
FIG. 5 illustrates in block diagrammatic form one embodiment of a slip gain corrector device of the present invention.

The utilization of the third harmonic component of the stator voltage in an apparatus and method for on-line, feedforward correcting of slip gain error in a continuously operating multi-phase induction motor, such as a wye connected three-phase motor, that is powered through an inverter is illustrated in FIG. 5. Here, a wye connected three-phase induction motor 10 is powered through an inverter means, specifically a current regulated pulse width (CRPWM) inverter 11. Motor 10 and inverter 11 are functionally associated with a slip gain corrector device 9.

The device 9 utilizes an indirect field oriented controller 24 that regulates inverter 11. The field angle is generated in the indirect field oriented controller 24 by summing a rotor position signal $\theta_r$ and a slip gain signal $K_s$. The rotor position signal $\theta_r$ is conveniently obtained directly from a shaft (incremental) encoder. The slip gain signal $K_s$ is produced by operation of the device 9. Preliminary knowledge of the machine parameters, such as rotor resistance $r_r$, magnetizing inductance $L_m$ and rotor inductance $L_r$, is required. The rotor resistance $r_r$ is affected by the variation of temperature (and skin effect in large machines). Inductances change with the saturation of the magnetic material. A rotor flux estimator in device 9 is necessary which generates rotor flux signals that are employed in the generation of the slip gain signal $K_s$.

The use of indirect field orientation is desirable since direct measurement of air gap flux, or flux estimation from sensed terminal voltages and currents, is avoided. Also, since, in many high performance applications, velocity or position feedback is already required, a rotor velocity or position signal is available at no additional cost. Device 9 can be considered to employ a combination of a direct and an indirect field oriented drive system.

When a term or variable quantity that is identified herein by a symbol has two subscripts and a superscript, the first subscript refers to the phase or the reference axis, and the second indicates whether the quantity pertains to the stator (s), the rotor (r) or the magnetizing branch. The superscript indicates the quantity tied to the synchronous (e) or stator (s) reference frame. Quantities marked by an asterisk (*) represent a reference value.

In indirect rotor flux field orientation, the q-axis component in the synchronous frame is equal to zero if the machine parameters are correctly estimated and properly used to tune the device 9. In indirect feedforward rotor flux field orientation, the slip frequency is a controllable input. In the device 9, instead of calculating the field angle directly, the rotor flux is used to inform the slip calculator where the rotor current vector should align with respect to the magnetomotive force (mmf) of the motor 10 when the device 9 is detuned. The position encoder 16 reduces the required accuracy of the estimated rotor flux compared to direct field orientation. In device 9, the model used for calculating the slip gain error is developed under the assumption that the change of rotor q-axis flux is slow enough to be ignored.

The device 9 uses a deadbeat controller which inherently inverts the non-linear system. Device 9 involves dynamic behavior and the rate of convergence is independent of the motor 10 operating point. Convergence is assured because the slip gain $K_s$ is chosen as the model reference.

When the estimated actual rotor flux deviates from the reference flux, a feedback loop seeks to regulate the actual rotor flux through a manipulated slip frequency input. The actual rotor flux converges in only a few correction sample periods because the predictive reference model is nearly correct despite errors in the initial parameter estimates. The effect is to force the system to have nearly constant dynamics.

In device 9, the three stator voltage phases of motor 10 are continuously summed by means of a conventional adder or summing amplifier 12, or the like, and the resulting additive signal is preferably filtered to identify a resultant third harmonic stator voltage $v_3$.

This third harmonic stator voltage $v_3$ is fed to an air gap flux estimator 13 as is a continuous measurement of the stator current in one stator phase thereof, identified as $i_a$ in FIG. 5 The voltage $v_3$ is integrated in the air gap flux estimator 13 to produce the amplitude of the third harmonic component of the stator flux $|\bar{\lambda}_3|$. Using a look-up table which incorporates data from the preliminarily measured (above-described) relationship between the amplitude of the third harmonic component of the stator flux linkage $|\bar{\lambda}_3|$ and the amplitude of the fundamental component of the air gap flux $|\bar{\lambda}_m|$, such as above illustrated in FIG. 4, the air gap flux estimator 13 compares the value of $|\bar{\lambda}_3|$ to values $v_3$ in the look-up table stored therein to determine the value of $|\bar{\lambda}_m|$.

Concurrently, the relative position of the fundamental component of the air gap flux with respect to the stator current $i_a$ is obtained in the air gap flux estimator 13 by continuous measurement of the phase displacement between two chosen points. One point is along the waveform of the third harmonic component of the stator flux and corresponds with the maximum value of the fundamental component of the air gap flux. The other point is along the stator current waveform and corresponds with the maximum value thereof.

From the information on each of the amplitude of the fundamental component of the air gap flux corresponding to phase a, $\lambda_m$ and its relative position in reference to the stator current $i_a$, the respective q-axis and d-axis values thereof are identified by the air gap flux estimator 13.

From the air gap flux estimator, these respective q-axis and d-axis component values for each of $|\bar{\lambda}_m|$ and $|i_s|$ are fed to a rotor flux estimator 14.

The rotor flux estimator 14 calculates from such input signals on-line values for each of the q-axis and the d-axis components of the actual rotor flux. In such calculations, the following relationships can be used:

$$\lambda^e_{qr} = \frac{L_r}{L_m} \lambda^e_{qm} - L_{lr} i^e_{qs} \quad (5)$$

$$\lambda^e_{dr} = \frac{L_r}{L_m} \lambda^e_{dm} - L_{lr} i^e_{ds} \quad (6)$$

where
λ indicates magnetic flux,
$L_r$ indicates rotor self inductance,
$L_m$ indicates magnetizing inductance,
$L_{lr}$ indicates rotor leakage inductance,
i indicates current,
superscript e indicates synchronous reference frame,
subscript s indicates stator,
subscript q indicates q-axis,
subscript d indicates d-axis, and
subscript r indicates rotor.

The parameters to which the field orientation is sensitive in this case are the rotor leakage inductance $L_{lr}$ which is substantially a constant value independent of temperature or flux level, and $L_r/L_m$ which is only moderately affected by saturation of the main flux paths in the machine. However, in machines with closed rotor slots (a typical construction in squirrel cage rotor machines), the rotor leakage inductance is strongly dependent on rotor current, especially at low values of rotor current.

By the use of the adder 12, the air gap flux estimator 13 and the rotor flux estimator 14, the present invention thus avoids the need to use flux sensors or the like which are associated with the motor 10. The third harmonic stator voltage signal $v_3$, which is obtained from the stator terminal voltages, is a sine wave that is practically free of noise. However, to identify and isolate this signal, filtering of the added phase voltages is preferred and is practically needed.

Also, the instantaneous value of the magnetizing inductance, which is needed to correct the flux and adjust for slip gain error, is obtained by measuring the third harmonic stator voltage signal $v_3$. Thus, magnetizing inductance is expressed as a function of the third harmonic air gap flux.

Concurrently with the functioning of the adder 12, the air gap flux estimator 13, and the rotor flux estimator 14, a field oriented reference model 15 is functioning. Into the field oriented reference model 15 are fed stator slip gain values based on no-load operating conditions above identified and on no-load slip gain $K_{so}$. Also, information identifying the instantaneous rotor position ($\theta_r$) is fed into the field oriented reference model 15, such as is obtainable by associating a conventional rotor position encoder 16 or the like with motor 10.

From such inputs $K_{so}$ and $\theta_r$, the field oriented reference model 15 outputs continuously reference values for each of the q-axis and the d-axis values of the stator current (identified as i*$_{qs}$ and i*$_{dr}$) and of the rotor flux (identified as $\lambda^*_{qr}$ and $\lambda^*_{dr}$).

A slip gain calculator 17 is provided which receives from the field oriented reference model 15 instantaneous values based on the rotor position $\theta_r$ for i*$_{qs}$ and $\lambda^*_{dr}$ as these terms are defined above. From these input values, the reference slip gain K*$_s$ is calculated.

The slip gain calculator 17 in device 9 can utilize the relationship:

$$S\omega_e = r_r \left(\frac{L_m}{L_r}\right) \frac{i^e_{qs}}{\lambda^e_{dr}} = \frac{L_m}{T_r} \frac{i^e_{qs}}{\lambda^e_{dr}} \quad (7)$$

wherein
$S\omega_e$ is slip gain,
$i^e_{qs}$ the q-axis component of the stator current in the synchronous reference frame, and
$\lambda^e_{dr}$ the d-axis component of the rotor flux in the synchronous reference frame.

The slip gain K*$_s$ value so calculated represents the desired value of the slip gain for motor 10 under the particular loaded conditions involved in the operation of the motor 10.

The respective reference values for each of $\lambda^{e*}_{qr}$ and $\lambda^{e*}_{dr}$ generated by the field oriented reference model 15 are mixed with the comparable respective calculated values for each of $\lambda^e_{qr}$ and $\lambda^e_{dr}$ that are produced by the rotor flux estimator 17 as above explained. To accomplish the mixing, a digital or computer system can be used or a pair of conventional subtractors or subtracting amplifiers 18 and 19, or the like, is employed.

Such respective difference values are each continuously fed into a slip gain error calculator 20 where such difference values are used to compute the estimated slip gain error ($\Delta K_s$) to correspond to that existing in the operating motor 10. In such calculation, the following relationship is used:

$$\frac{\Delta \hat{m}}{\hat{m}} = \frac{\Delta \lambda^e_{dr}}{\lambda^e_{dr}} + \frac{\Delta \lambda^e_{qr}}{L^*_m i^{e*}_{qs}}$$

$$K_s^* = \hat{m} \lambda^{e*-1}_{dr} = \frac{L_m}{T_r^*} \frac{1}{\lambda^{e*}_{dr}}$$

The reference slip gain K*$_s$ value produced by the slip gain calculator 17 is mixed with the thus determined values of the slip gain error $\Delta K_s$. To accomplish this mixing, a conventional subtractor or subtracting amplifier 21 can be employed. The difference between K*$_s$ and $\Delta K_s$ is the estimated actual slip gain $K_s$.

Values for the slip gain $K_s$ thus generated can be used to control the energizing voltages and the currents fed to the rotor 10. However, the slip gain corrector device 9 incorporates an assumption that the rate of change of motor q-axis flux is slow enough to be ignored. If this assumption is violated, a slip gain $K_s$ estimation error results. Thus, the values for $K_s$ determined by the device 9 cannot be applied continuously, but can only be applied at discrete time intervals. This follows because, after a slip gain correction is made by inverter 11, the rotor flux $\lambda_r$ changes transiently. Therefore, a minimum time period which is preferably three times the rotor time constant is required for the rotor flux to settle to a value which is about 5% of its steady state value.

Device 9 preferably utilizes a means providing a sample and hold function 22. The sample and hold means 22 can be, for example, a conventional latch. With such a sample and hold means 22, the sampling period is set at a time which is preferably at least about three, and more preferably at least about four, times the rotor time constant. For example, at a 10 Hz sample rate, one does not need to track the dynamics of the rotor time constant because the update rate is faster than any thermal effects. Such more preferred period causes the rotor flux to settle to within 2% of its steady state value. However, those skilled in the art will appreciate that it is not necessary to utilize a fast microprocessor in embodiments of this invention because of the relatively long sampling period associated with the use thereof.

Preferably, a low pass filter 23 is utilized to filter the $K_s$ values produced. Because of the nature of switching inverters, substantial noise is found to be characteristically superimposed on the current and voltage. When the noise is sampled and used in the slip gain corrector device 9, it can cause a noise ripple in the slip gain $K_s$. A low pass filter removes these ripples. More preferably, a low pass filter with a cutoff frequency tuned to about 2 Hz is employed so that a critical damping step response is obtained. The cutoff frequency of the filter affects the response dynamic because of the delay it introduces.

Thus, in device 9, the continuously output $K_s$ values from subtractor 21 are passed first through a low pass filter 23 and then into a sample and hold memory location 22. As discussed, this can be accomplished using a computer and appropriate software. Typical and illustrative times for updating the slip gain range from about 100 milliseconds to 1 second, although longer and shorter times can be used, if desired.

$K_s$ signals from the sample and hold memory locations are output therefrom into the indirect field oriented controller 24 which also continuously receives signals representative of on-line q-axis and d-axis values of stator current (identified as $i^*_{qs}$ and $i^*_{ds}$) and a signal representative of the rotor position $\theta_r$.

From the indirect field oriented controller 24, corrected phase current output signals are fed into the current regulated inverter 11. Suitable such inverters are available commercially from various manufacturers. The inverter 11 generates from a power supply (not shown) currents and voltages which are corrected for the estimated slip gain error $\Delta K_s$ and which are suitable for powering the motor 10, as shown.

Device 9 is preferably provided with a lower operating limit to ensure that the estimated slip gain is not less than or equal to zero. Also, device 9 is preferably provided with an upper operating limit to ensure that the estimated slip gain will not cause the motor 10 to run in an unstable state.

Figure 6:
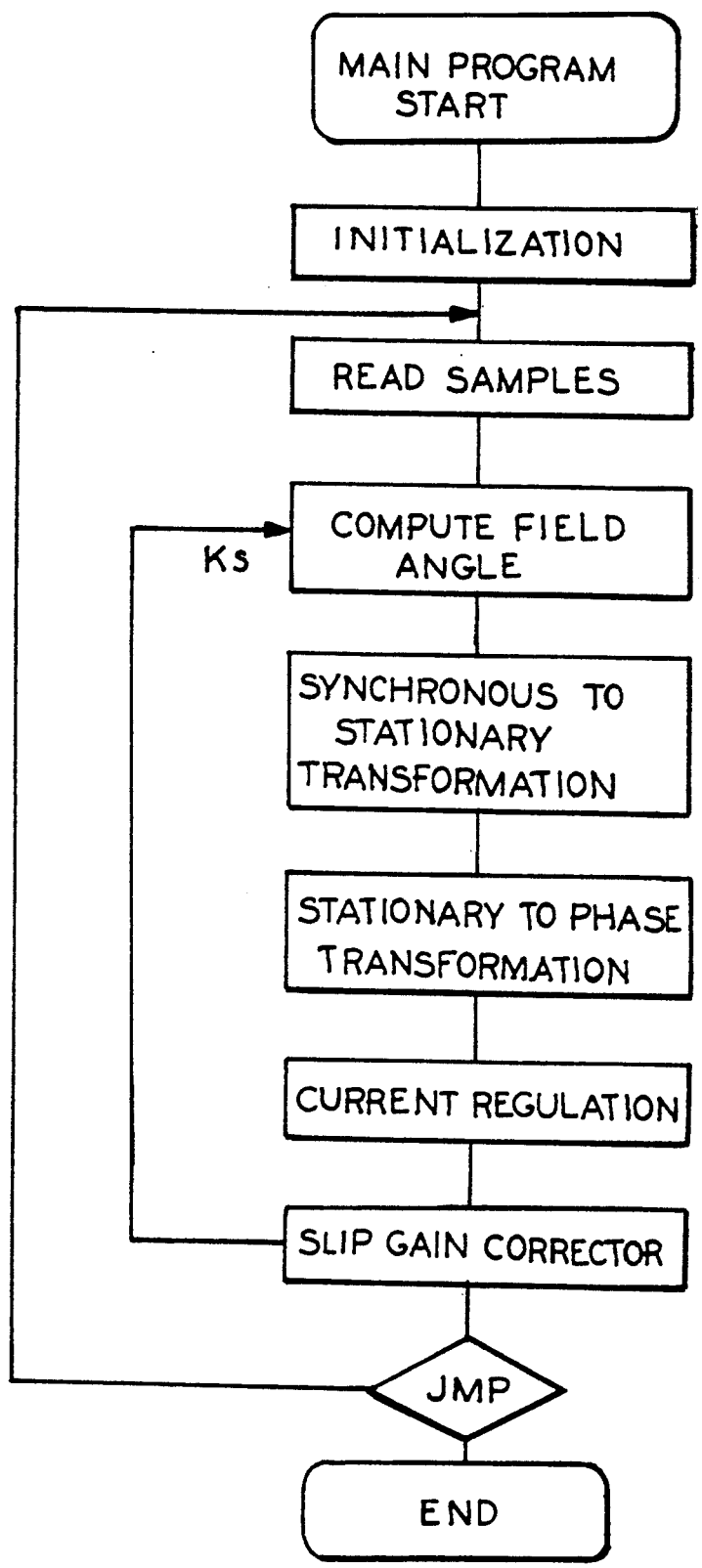
FIG. 6 illustrates one embodiment of a control algorithm suitable for use with a slip gain corrector such as shown in FIG. 5.

A program can be written to implement the indirect field oriented slip gain corrector device 9. The block diagram of such a program is shown in FIG. 6. The main program consists of different sections each with specific functions. While various programmable digital processors can be used, a present preference is to employ a Motorola DSP56001 DSP and its application development module (ADM) board. To interface with the DSP56001 hardware, it is presently preferred to employ an IBM PC using the MS-DOS operating system as the host platform. The program employs sequential sections identified as (A) through (G):

(A) In the beginning of the program, a section called "initial" is used to initialize the DSP ADM board.

(B) In this section, measurements are input into the DSP and manipulate the data into a useful form. The sequences of this section is listed as follows:
 1) start conversion for all four channel A/Ds simultaneously and encoder interface,
 2) read in the rotor position and then calculate the rotor speed while the A/Ds are still in the conversion process,
 3) input the phase "a" and "b" currents and transform them into dq stationary reference frame variables,
 4) read in the third harmonic voltage and take out the dc offset,
 5) filter the third harmonic voltage by a low pass filter,
 6) integrate the third harmonic voltage to get the third harmonic air gap flux,
 7) detect the zero crossing of the third harmonic voltage. If true, save the current third harmonic air gap flux as peak value,
 8) detect the zero crossing of the third harmonic air gap flux and count the number of zero crossing, and also save the value of the field angle as a first field value, and
 9) detect the zero crossing of the phase "a" current, and save the value of the field angle as a second field value. Set the zero crossing count of the third harmonic air gap flux to zero.

(C) In this section, slip angle is calculated based on the update slip gain value and then summed to the rotor angle to get the field angle.

(D) The current commands are transferred from synchronous to stationary reference frame.

(E) After being transferred to the stationary frame, currents are then transformed from 2Φ to 3Φ phase variables.

Figure 8:
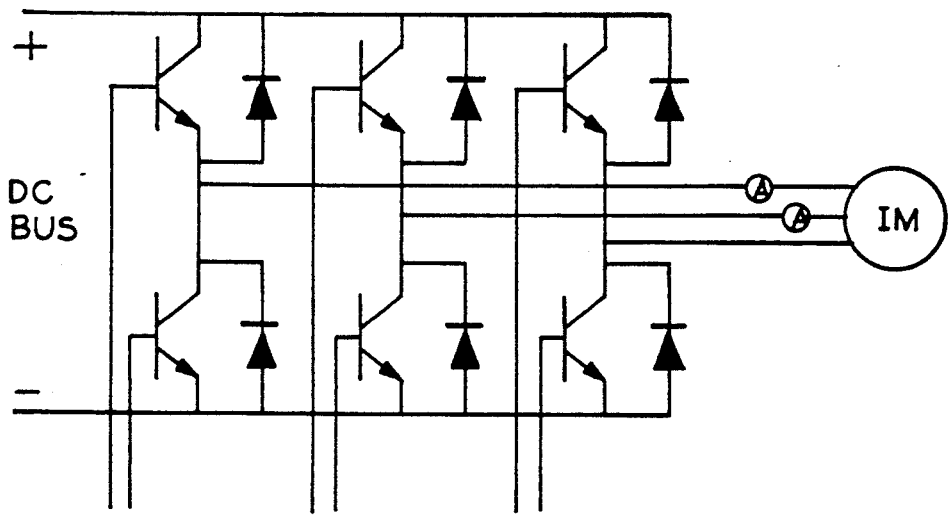
FIG. 8 is a simplified diagram of a hard switched pulse width modulated (PWM) servo amplifier wherein gating signals are controlled in the digital regional processor (DSP) interface.

(F) At this point, the indirect field oriented controller is constructed and ready to output to the current regulator of the invention drive. For example, three comparators are used to compare three phase current commands and measured currents. If the command value is greater than the measured value, then a gating signal is set to turn on the upper transistor as shown in FIG. 8. Similarly, if the measured value is greater than the command value, then a gating signal is set to turn on the lower transistor. Such a scheme is referred to as a "delta-modulation" or "bang-bang" current regulation strategy. Once the gating signals are set, then they are output to the PWM driver interface from the digital output board. The inverter 11 generates from a power supply (not shown) currents and voltages which are corrected for the measured slip gain error $\Delta K_s$ and which are suitable for powering the motor 10, as shown.

(G) The slip gain correction is calculated as follows:
 1) The magnitude of the fundamental air gap flux is selected from the table,
 2) The first field value is subtracted from the second field value to get $\gamma_{im}$ and then the current is added to vector angle $\theta_{is}$ to get air gap flux vector angle,
 3) The angle and magnitude of the air gap flux is resolved into dq-axis air gap flux in synchronous reference frame,
 4) Rotor flux is estimated based on equation (5) and equation (6) above,
 5) The measured stator currents are transformed from stationary to synchronous frame,
 6) The ac noise is filtered out using a low pass filter, and
 7) The calculated slip gain is applied to calculate the slip angle and field angle.

After Section G, the program will be repeated from Section B again until the program is stopped by the user. The overall assembly program takes about 100 microseconds of which about 30 microseconds are delay time using the DSP5600 microprocessor.

Device 9 is preferably provided with a lower operating limit to ensure that the estimated slip gain is not less than or equal to zero. Also, device 9 is preferably provided with an upper operating limit to ensure that the estimated slip gain will not cause the motor 10 to run in an unstable state.

Another embodiment of a slip gain corrector device is provided with an upper operating limit to ensure that the estimated slip gain is less than or equal to zero. Also, device 9 is preferably provided with an upper operating limit to ensure that estimated slip gain will not cause the motor 10 to run in an unstable state. See also Moreira et al., "A Simple and Robust Adaptive Controller for Detuning Correction in Field Oriented Induction Machines", Conf. Rec. of IEEE Industry Applications Society Annual Meeting, pages 397–403, October 1991.

Figure 7:
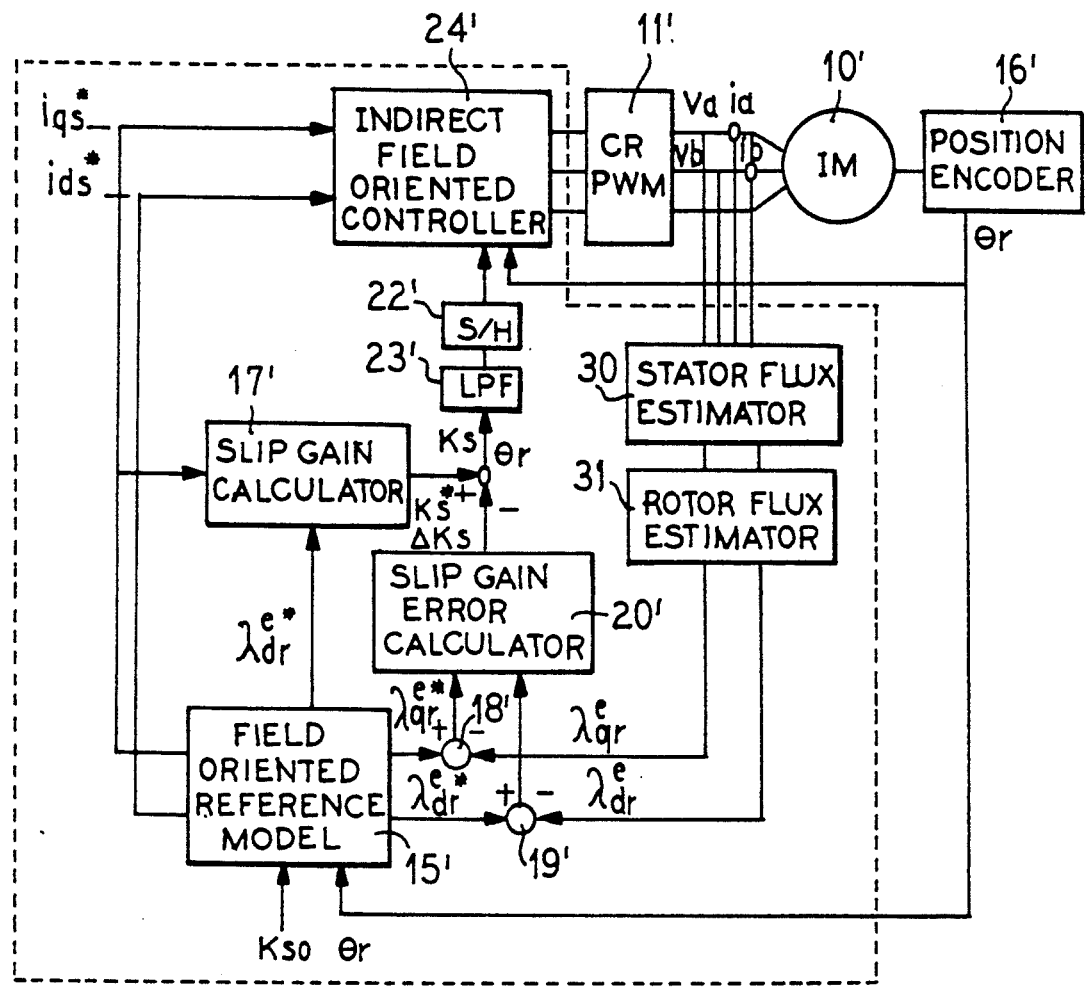
FIG. 7 is a block diagram similar to FIG. 5 but showing an alternative embodiment of a slip gain corrector device of the present invention.

Another device of the present invention is shown in FIG. 7 and is identified herein for convenience by the numeral 29. Components of device 29 which are similar in structure and function to device 9 are similarly numbered, but include prime marks for identification.

In device 29, adder 12 and air gap flux estimator 13 are replaced by a stator flux estimator 30 which receives continuously instantaneous input signals identifying the stator voltages and the associated respective stator currents existing in each of the stator phases. From such input signals, the stator q-axis and d-axis flux values are calculated using the relationship:

$$\lambda^s_{dqs} = \int (V^s_{dqs} - r_s i^s_{dqs}) dt \quad (8)$$

$$\lambda^s_{ds} = \int (v^s_{ds} - r_s i^s_{ds}) dt$$

$$\lambda^s_{qs} = \int (v^s_{qs} - r_s i^s_{qs}) dt$$

where the terms are as above described.

From the stator flux estimator 30, these respective q-axis and d-axis component values are fed to a rotor flux estimator 31 which calculates on-line values for each of the q-axis and the d-axis components of the actual rotor flux using the following relationship:

$$\bar{\lambda}^s_{dqr} = \frac{L_r}{L_m} (\bar{\lambda}^s_{dqs} - L_{ls} \bar{i}^s_{dqs}) \quad (9)$$

where the terms are as above described.

Although the device 29 of FIG. 7 is practical over a reasonable rotor speed range, use of the foregoing equations in the estimators 30 and 31 presents problems. Thus, stator resistance $r_s$ is a significant problem because of the temperature dependence (and skin effect in large machines). Also, in addition to stator resistance, there is a need for data on two other motor parameters, $L_r$ and $L_r/L_m$. Further problems are that low frequency signals are difficult to accurately integrate and that stator IR becomes dominant at low speed. Hence, device 29 is not accurate for use at low rotor speeds.

The foregoing program for device 9 has been adjusted for use with device 29. Thus, in Section B, items 4 through 7 are replaced by the following item 4:

4) input the line voltages "ab" and "ca" and transform them into dq stationary reference frame variables.

Also, Section (G) becomes:

1) estimate stator flux based on equation (8) above,
2) estimate rotor flux based on equation (9) above,
3) transform the rotor flux and measured stator currents from stationary to synchronous reference frame,
4) calculate the slip gain error based on equation (17) below,
5) calculate the correct slip gain based on the error and previous value of slip gain,
6) filter out the ac noise by using a low pass filter, and
7) apply the calculated slip gain to calculate the slip angle and field angle.

After Section (G), the program will be repeated from Section B again until the program is stopped by the user.

EXAMPLE 1

In order to evaluate the performance of the slip gain corrector device 29 of FIG. 7, torque response is used. Before testing the slip gain corrector, the correct slip gain value must be found so that a reference is established to judge the performance of the slip gain corrector. To do this, a square wave torque command was applied to the field oriented controller. If the tuning parameters are correct, then a triangular speed waveform should be observed (R. O. Lorenz, "Tuning of Field Oriented Induction Motor Controllers for High Performance Applications", Conf. Rec. of IEEE Industry Applications Society Annual Meeting, pages 607–612, October 1985).

Figure 9:
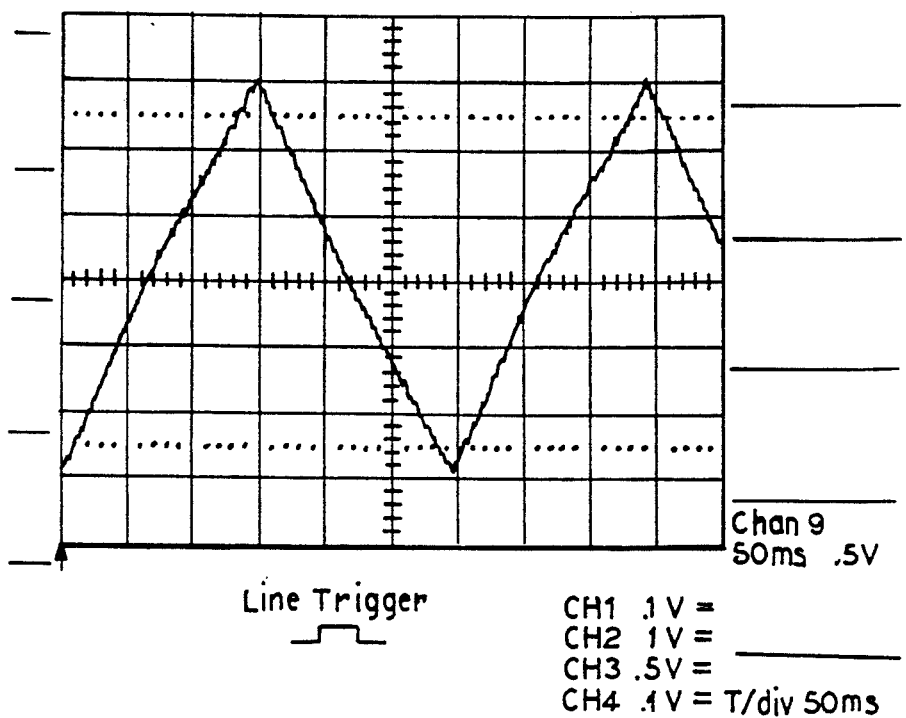
FIG. 9 is an oscilloscope trace for the speed waveform ($R_{20}$) of a field oriented motor drive after tuning for a square wave torque command using a device of FIG. 7 operating at a rotor speed of 75 rpm/div.

Therefore, the rated flux command and a torque command (which is a 3.3 Hz square waveform with no dc offset) were applied to indirect field oriented controller 24 to tune the field orientation. As a result, the slip gain of the induction motor with zero external rotor resistance, which gave the best triangular speed waveform as shown in FIG. 9, was 2.0 volts at 75 rpm/div when displayed on the oscilloscope. In this test, the induction motor was decoupled from the dc machine. However, it was apparent that the speed waveform was still not quite triangular at field orientation. This was because of the draft effect of the wound rotor induction motor, especially brush drag. The speed waveform under detuning was determined with the rotor resistance changed to about twice of its original value. If the speed was high enough, which was found to be about 30 Hz, the back emf of the induction machine was about the same voltage as the DC bus of the PWM inverter 11 and the current started losing its regulation.

After the correct slip gain was found, this slip gain value was programmed into the field oriented controller 24 as the initial value and then the program described above was executed to evaluate the performance of the device 29. The speed waveforms when the induction motor had zero added rotor resistance ($1R_{20}$) and twice its rotor resistance value ($2R_{20}$), respectively, were evaluated. For convenience, $R_{20}$ is defined as the original rotor resistance and is used in these Examples. It was observed that the speed waveforms (after the application to the device 29) were very close to the tuned field orientation shown in FIG. 9.

Figure 10:
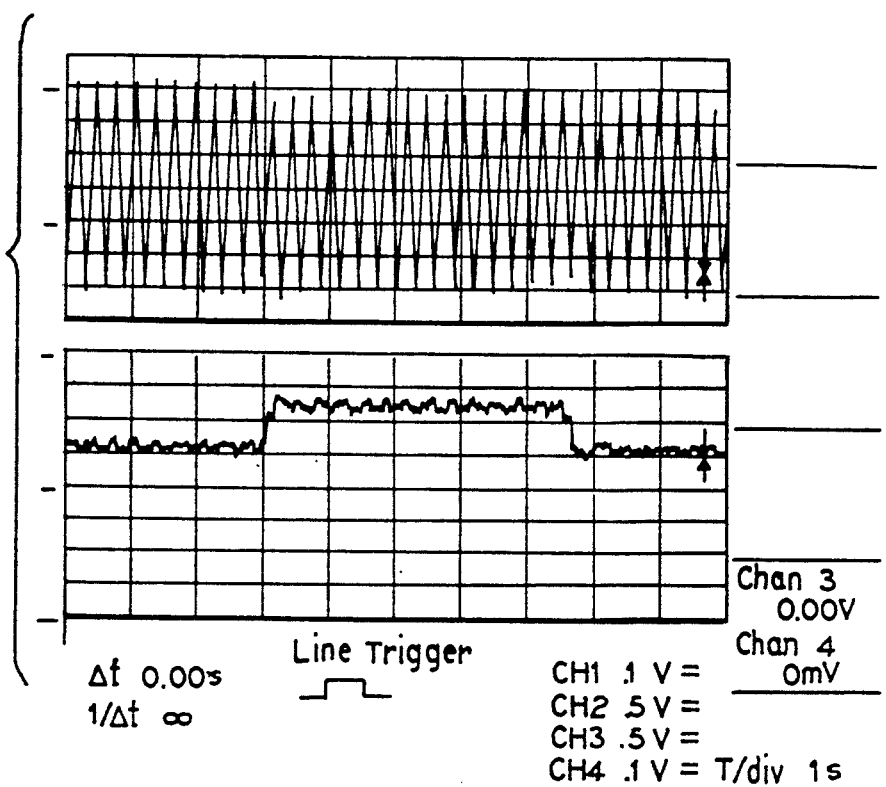
FIG. 10 shows oscilloscope traces, illustrating transient responses occurring in the tuning process with a step change of rotor resistance between ($R_{20}$) and ($2R_{20}$) using a device of FIG. 7, the top trace being the response of the motor speed waveform and the bottom trace being the response of the slip gain in the slip gain corrector device at a rotor speed of 75 rpm/div and a slip gain of 2 volts/div.

The transient tuning response is shown in FIG. 10 for the device 29. The top trace is the triangular speed waveform. The bottom trace shows the dynamics of the slip gain adaptation for both adding and removing the two times step change in rotor resistance. The operating condition in this case was identical to the one shown in FIG. 9. The slip gain converges in 0.2 seconds which is about two sample periods of the sample-and-hold function. The near deadbeat response of the predictive feedback control therefore was verified.

The response shown in FIG. 10 is consistent with the fact that the adaptive controller does not include the derivative terms and thus had an incorrect initial response to step changes. This is because a step change of rotor resistance violates the assumption of the slip gain corrector only at that particular moment. FIG. 10 also shows that there is a steady state error and this error is due to the measurement offset. It was also noticed that the offset error modulated by the torque command produces ripple in the slip gain. When this offset is compensated, small steady state error and reduced ripple are observed.

In order to eliminate the offset, a measurement is made on the rotor flux error when the system is under field orientation. When the system is field oriented, the rotor flux of the machine follows commands; hence, there is no error between the machine rotor flux and the commands. If there is any error, it is assumed to be due to the offset of the instrument. Therefore, the rotor flux errors are measured and subtracted from the rotor flux commands for compensation. In order to verify the correctness of the compensation, the adaptive controller is applied. If a wrong compensation is made, the adaptive controller will change the slip gain to force the rotor flux error to zero. As a result, the slip gain was changed a little bit because a small amount of dc offset was still there. However, the results verified that the dc offset was greatly reduced.

The current waveform, because of the nature of delta modulated current regulation strategy, had a hysteresis band superimposed on the fundamental component of the current. When this noise is sampled and used in the slip gain corrector, it causes noise/ripple in the slip gain. Therefore a low pass filter is used to filter out these ripples. The low pass filter has a cutoff frequency tuned to 2 Hz so that a critical damping step response was obtained. It was also shown that the cutoff frequency of the filter changed the dynamics of the response because of the delay it introduced.

In order to evaluate the generality of the slip gain corrector, tests were done for different torque and flux commands at different speeds. The response of the slip gain corrector with the q-axis stator current command at 100% and 50% rated values, respectively, were determined while the d-axis stator current command was held constant at 100% rated value. Also, the situation at rated torque and flux commands but at zero speed was determined, as were the responses at 50% rated flux and 200% q-axis stator current command. In this latter case, it was noted that the correct slip gain was doubled when the rotor flux command was halved.

From such data, several observations were drawn as follows:

1) The rate of convergence is the same as shown in FIG. 9 and it is independent of the speed, torque and flux commands. Therefore, the non-linearities of the machine do not appear in the slip gain corrector.

2) When the machine rotor resistance increases, the rate of convergence is different from the one when the machine rotor resistance decreases. There are two reasons for this. The first reason is that the rate of step-changing the rotor resistance is different. The second reason is that when the machine rotor resistance increases, then the slip frequency command will be smaller than the correct value, therefore the rotor flux increases because of the increased magnetizing current.

The same analysis can be done when the machine rotor resistance decreases. In this case, rotor flux decreases and the slip gain error model will underestimate the error $\Delta m$. However, it is important to note that the error $\Delta m$ is different in both cases. When the machine rotor resistance increases, the rate of changing flux is faster than the one when the machine rotor resistance decreases (as in the plot for the variation of rotor flux due to detuning). Therefore, the error is larger in the former case while it is smaller in the latter case. It should be noted that the flux derivation is larger in the former case than the latter, thus it takes more time for the flux to settle to its steady state. As a result, it can be concluded that when the rotor flux changes to a value which is smaller than the command value, the slip gain corrector generally will converge to the correct value faster than the case which the rotor flux is larger than the command value. This observation agrees with most of the experimental results, except for the one which is due to the first reason.

3) As the current commands decrease, the effect of offset becomes more significant, therefore estimation error increases.

4) As the speed decreases, the accuracy of the stator resistance as well as the offset of the system become more significant, therefore estimation error increases.

A test at start-up was also done. In this test, the slip gain was tuned at its prior value. However, before start-up, the rotor resistance was changed to twice its original value. Therefore, the slip gain in the controller was 50% of the correct value. Then, the machine was started up. In this case, the rated torque and flux commands were applied to the field oriented controller. The response was the same as the step change test because the step change was done before start-up.

Therefore, this result implies that one can initialize the slip gain by guessing a value and the slip gain corrector will converge to its correct value as long as the initial value is within the range of lower and upper limits of the slip gain corrector. Without any given machine information, the upper limit of the slip gain is unknown; however, the lower limit is always zero. Therefore, without any given machine information, one can tune the indirect field oriented controller by just initializing the slip gain at a value slightly greater than zero and then applying the slip gain corrector at start-up.

In indirect field orientation, correct position feedback is required by the indirect field oriented controller. The implementation of the encoder interface board consisted of four units: signal conditioning unit, pulse-counting unit, control unit and output latches unit.

The input signals of the encoder interface were sequences of pulses which came from a 1024-line encoder. Usually the incoming signals were contaminated by the mechanical and electrical noise. Therefore, a signal conditioning unit was designed to clean up the signals. In this unit, the first stage was a first order low pass filter with a high cutoff frequency which filters out the high frequency noise without modifying the square shape of pulses. The second stage was a differential receiver which allows the DSP system to isolate from the encoder electrically while reducing the noise to a further degree.

The second unit was the pulse-counting unit. In this implementation, a Hewlett Packard HCTL-2000 chip was adapted for this purpose. The HCTL-2000 is an HCMOS IC that performs the quadrature decoder, counter, and bus interface function. It consists of a 4* quadrature decoder, 12 bit binary up/down counter, and 8 bit bus interface. A 12-bit latch captures the position counter output data on each rising clock edge, except when its inputs are disabled by the inhibit logic section during two-byte read operation.

A control unit was required to control the timing of the whole read operation. When the encoder interface was selected (the address pin A9 is low) and the write (WD) signal was low, then it started to latch the 12-bit data from the up/down counter to the output latches unit. In the actual process, a two-byte read operation was required to output 12-bit data into the latches. The timing of these two-byte ready operations was controlled by the monostable chips. The first half of dual-monostable chip U7 was used to set the timing signal which is required to output the highest 4-bit to the external latch U2. The end of this timing signal triggered the second-half monostable chip U7. The second timing signal in turn enabled the output of lower byte data latched to U1. At this moment, the 12-bit data was ready to be read by the DSP. The input data operation was simply done by inserting a low read (RD) signal and interface-select signal. Since the DSP data bus is 24-bit, the most significant 12-bit was set to low by setting the corresponding signals in U3 and U4 while the lowest 12-bit data represents the rotor position. The overall process takes about 750 nanoseconds.

EXAMPLE 2

Studies were conducted to demonstrate that the technique incorporated into device 9 is less parameter sensitive than the technique incorporated into device 29 of FIG. 7. Thus, tests are done for different operation conditions. The same wound rotor induction motor was used throughout the study. In this study, tests and an air gap flux detection algorithm were designed based on steady state operation. This is because a simple algorithm can be done by detecting the zero crossing point of third harmonic voltage and stator current as shown above. The rotor resistance was changed the same way as in Example 1.

Figure 11:
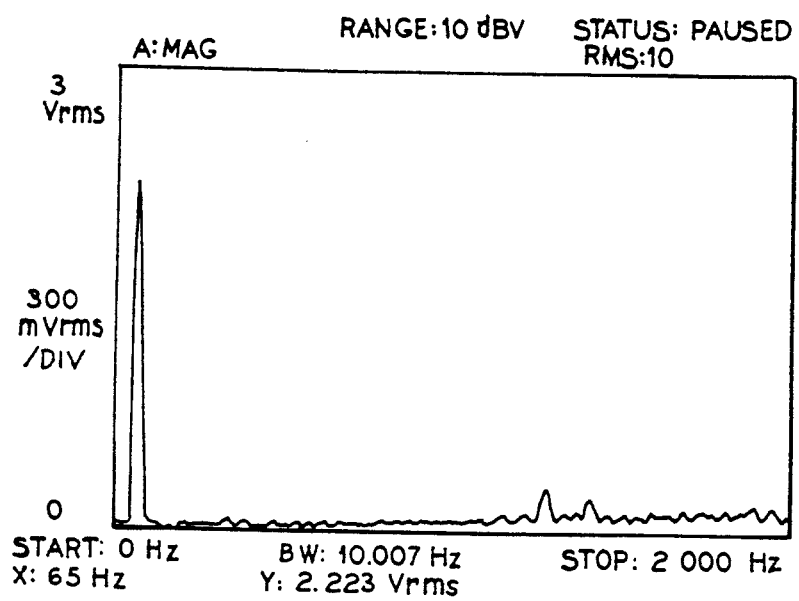
FIG. 11 is an oscilloscope trace showing spectrum contents (uncorrected) for the summed phase voltages with frequency in Hz being shown as abscissae and root mean square voltage being shown as ordinates in a operating device of FIG. 5.

The spectrum contents for the third harmonic signal is shown in FIG. 11. As predicted, after the summation of the three phase voltages, all the polyphase components (fundamental, 5th, 7th, 11th, and so forth) are eliminated and the third harmonic is clearly the dominant component at the lower side of the frequency spectrum. The PWM inverter utilized for these measurements had a switching frequency which contaminated the third harmonic voltage. Therefore, filtering was required, but at the cost of phase delay. A low pass filter with cutoff frequency of 280 Hz was applied to the third harmonic voltage so that phase delay did not significantly affect the detection of the air gap flux vector.

Figure 12:
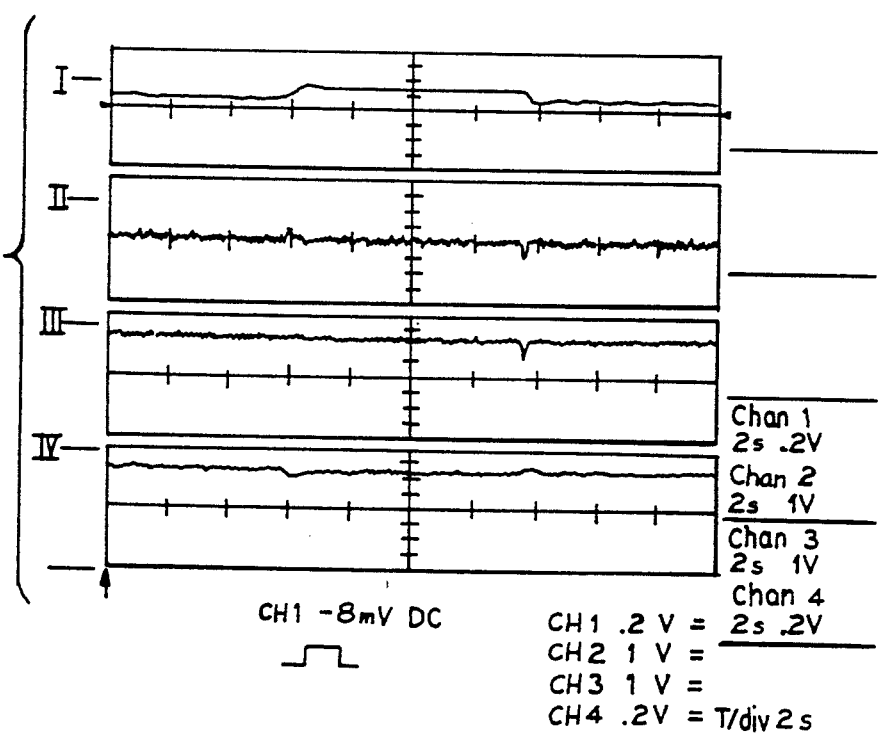
FIG. 12 shows oscilloscope traces illustrating the closed loop slip gain response of the device of FIG. 5 for an associated motor operating at rated torque and flux commands with a step change of rotor resistance between ($R_{20}$) and ($2R_{20}$) wherein trace I is the slip gain of the device (2 volts/div), trace II is the estimated q-axis rotor flux (1 volt/div), trace III is the estimated d-axis rotor flux (1 volt/div) and trace IV is the shaft speed (300 rpm/div)
Figure 13:
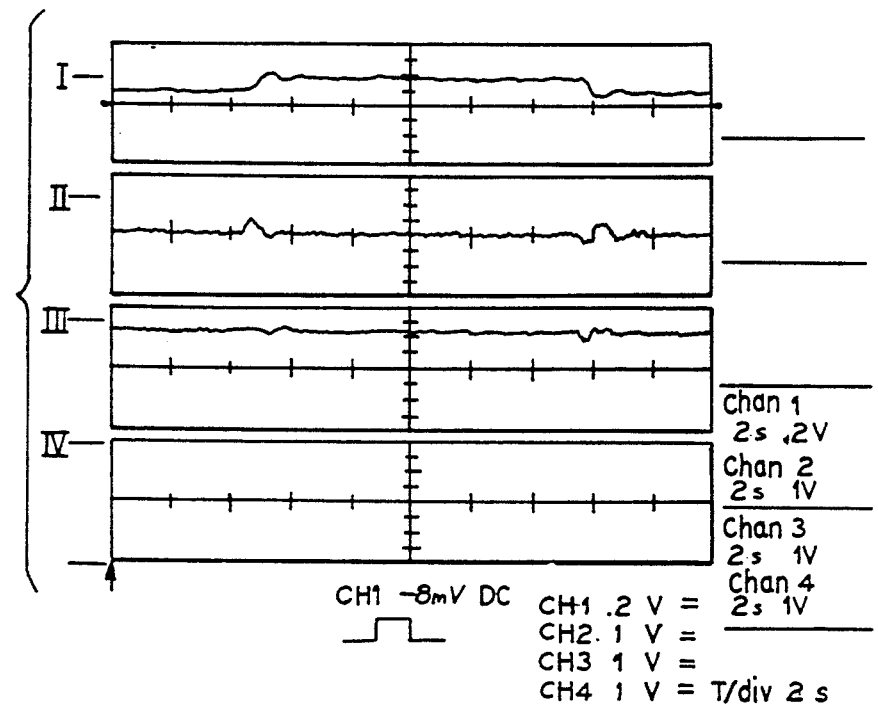
FIG. 13 shows oscilloscope traces similar to FIG. 12 for the device of FIG. 5 similarly operating but in a locked rotor test wherein trace I is the slip gain of the device (2 volts/div); trace II is the estimated q-axis rotor flux (1 volt/div); trace III is the estimated d-axis rotor flux (1 volt/div) and trace IV is the shaft speed (150 rpm/div)

FIGS. 12 and 13 show the response of the drive system with rated torque and flux commands at 705 rpm and zero rotor speed, respectively. It was noticed that a steady error occurs in FIG. 11. This was because the system was uncalibrated. Therefore, the offset of the instrument caused a constant error in the slip gain estimation. In this case, this constant slip gain error was approximately 0.8 volt (in these Figures). At zero speed, the induced third harmonic voltage becomes very small and therefore it can be easily contaminated by the noise in the system. When the signal was contaminated, error occurred in the detection of air gap flux vector, and then it caused error in the estimation of the slip gain as shown in FIG. 13. When the offset error was compensated, the error in slip gain estimation was about the same in device 29. When the cutoff frequency of the filter decreased as the rotor speed decreased, it minimized the effect of system noise.

The cases for 50% of the rated q-axis and d-axis stator current commands and start-up were investigated. Their performances were similar to those of device 29. However, the accuracy of slip gain estimation technique presented in device 9 is better than in device 29. The reason is probably that the third harmonic voltage is generally cleaner than the line voltages, hence the third harmonic voltage can provide a better estimate of rotor flux. Therefore, filtering for the line voltage signal is necessary in device 29. When the flux decreases to half, the magnitude of the third harmonic flux becomes very small because the air gap flux is only slightly saturated. However, the signal is still strong enough to be sensed accurately, but the resolution of air gap flux table is not enough.

Therefore, a quantization induced derivation in the air gap flux estimation is produced from the look-up table (see FIG. 4) and it causes a slip gain estimation ripple. It is important to mention that changes in the magnetizing inductance are associated with the air gap flux level, which is a function of the stator current d-q components. Thus, changes in the torque or flux commands will change the air gap flux level and consequently the magnetizing inductance, especially if the machine operates in the non-linear segment of the magnetization characteristic curve. In this case, a magnetizing inductance table is required.

The present invention can also provide an adaptive controller for correction of the rotor time constant used for the calculation of slip frequency in indirect field oriented control (IFOC) of induction machines. Two different embodiments of the controller method and means are provided. This can provide IFOC-type adaptive controllers which are simple, reliable, and independent as much as possible of the induction machine parameters. The adaptive controllers can be retrofitable into existing induction machine systems.

The adaptive controllers depend on one variable, the air gap flux. Thus, in the present invention, a model reference adaptive controller (MRAC) and also a feedforward/predictive feedback controller (FPFC) are provided which are each useful with an induction machine for indirect field oriented control.

The MRAC depends only on a single, easily measurable machine parameter estimate, namely, the magnetizing inductance. Moreover, a correction strategy to compensate for changes in the magnetizing inductance due to changes in the air gap flux level is also provided. Such strategy is based on a function which relates the value of this inductance to the third harmonic voltage amplitude. As a result, the controller is very reliable with regard to dependence on machine parameters. However, the MRAC tends to exhibit high sensitivity to the machine operating condition.

The FPFC utilizes the rotor magnetic flux which is computed from the air gap magnetic flux as estimated from the third harmonic voltage signal. Consequently, this controller is dependent on the rotor leakage inductance which contributes to a certain loss of reliability. Its response, however, characteristically tends to be less sensitive to the machine operating condition than the MRAC.

These controllers do not require any sensors in the air gap of the machine nor complex computations of machine parameters or variables. Only access to the stator neutral connection is necessary in order to estimate the air gap flux.

Both the MRAC and the FPFC IFOC adaptive controllers of this invention utilize the method of estimating the air gap flux and/or rotor flux from the third harmonic component of the stator phase voltages that is provided by this invention. Similarly to what is done in the hereinabove described efficiency controller of this invention, the amplitude of the fundamental air gap flux component, $|\lambda_m|$, is first obtained from the amplitude of the third harmonic component of stator voltage $V_3$ as derived from the integration of the third harmonic stator voltage signal $v_{s3}$ resulting from the summation of the three phase voltages in a three phase induction motor. Then, the amplitude of the fundamental component of the flux linkage is expressed in terms of the third harmonic flux component by the non-linear function of Eq. (3). Values for $|\lambda_m|$ are measured for a given machine or machine type. An example of values obtained for this function for one motor is given herein involving simulation results.

The relative position of the fundamental component of the air gap flux with respect to the stator current is obtained by measuring the phase displacement between two fixed points, one in the third harmonic air gap magnetic flux and the other in the stator line current waveform so that the waveform displacement corresponds to the phase displacement between the maximum values for each of the fundamental components of current and air gap flux.

The fundamental and third harmonic components of the air gap flux, and also the stator current, are depicted in the vector representation in FIG. 3 from which it is clear that the air gap flux is resolvable into its d and q components from a knowledge of its magnitude and the respective angles $\gamma_{im}$ and $\theta_{is}$.

The dependence of the MRAC type of controller on machine parameters is minimizable when a convenient machine variable is chosen. In accord with the present invention, which variable is the air gap magnetic flux, one needs only a knowledge of the magnetizing inductance of the machine to establish an IFOC-type adaptive controller for the rotor time constant.

The MRAC controller utilizes the air gap flux measured from the third harmonic content of the stator voltages for both rotor time constant estimation as well as magnetizing inductance estimation. The air gap magnetic flux so measured is resolved into its d and q components. The d component is utilized in the adaptation scheme for the rotor time constant. The q component is utilized to show the magnitude of the flux or to estimate the magnetizing inductance.

The d-axis component of the air gap flux, which has the same value as the rotor flux when the machine is field oriented is then computed as shown in Eqs. (1) and (2) above.

Figure 14:
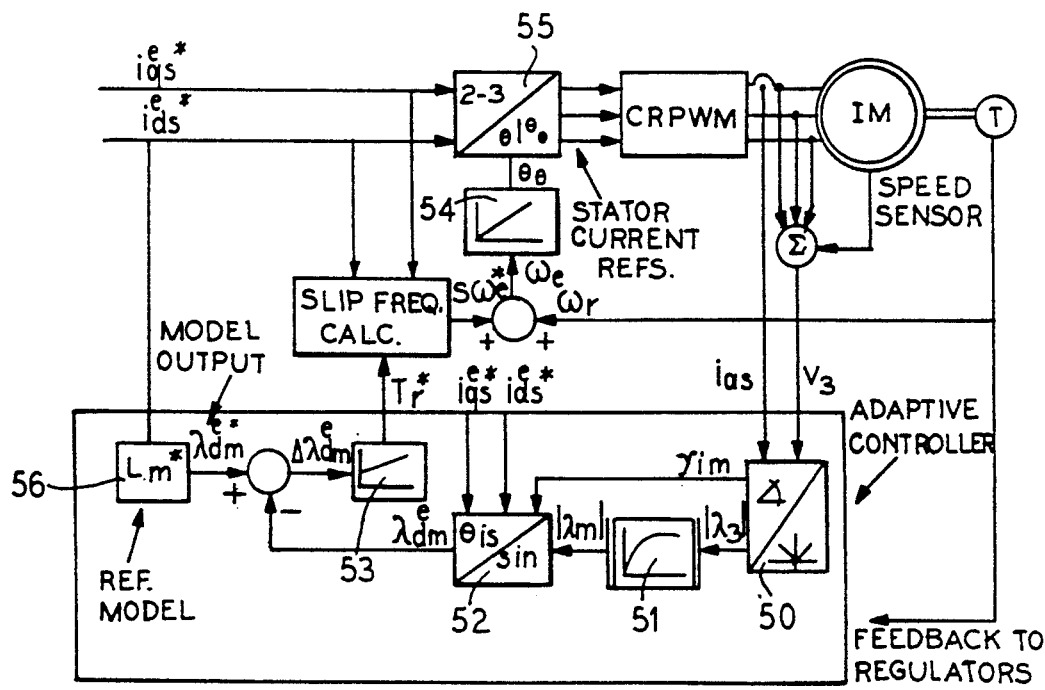
FIG. 14 is a block diagrammatic view of another embodiment of a controller for a three phase induction machine utilizing a slip frequency calculator assuming invariant magnetizing inductance.

The air gap flux d-axis component computed from Eq. (1) above is utilized by the MRAC. FIG. 14 illustrates an embodiment of the MRAC for rotor time constant correction.

The simplicity of the MRAC is striking. It requires only an estimate for the magnetizing inductance, $L^*_m$, in order to set the flux reference value, $\lambda^{e*}_{dm}$, which, together with the flux computed as in Eq. (1) defines a flux error signal, $\Delta\lambda^e_{dm}$. This error is driven to zero by a regulator as the rotor time constant, $T_r^*$, is adjusted to its correct value. The MRAC simplicity is possible only because of the choice for the model output chosen, $\lambda^e_{dm}$ in this case.

In spite of the simplification obtained, the MRAC still depends on the magnetizing inductance, a parameter that is likely to vary with changes in the machine operating conditions. Variations in the magnetizing inductance are characteristically associated with the air gap flux level which is a function of the stator current d and q components. Therefore, changes in the torque or flux commands produce variations in the air gap flux level, and, consequently, in the magnetizing inductance, especially if the machine operates in the non-linear segment of the magnetization characteristic curve, as is common.

A function has been discovered which relates the actual value of the magnetizing inductance with the magnitude of the third harmonic flux component. This function can be considered to have been obtained from the function relating the fundamental air gap flux amplitude and third harmonic air gap flux amplitude described by $f_\lambda$ in Eq. (3). This function, designated as $f_{Lm}$, is:

$$L_m = f_{Lm}(|\lambda_3|) \tag{10}$$

Figure 15:
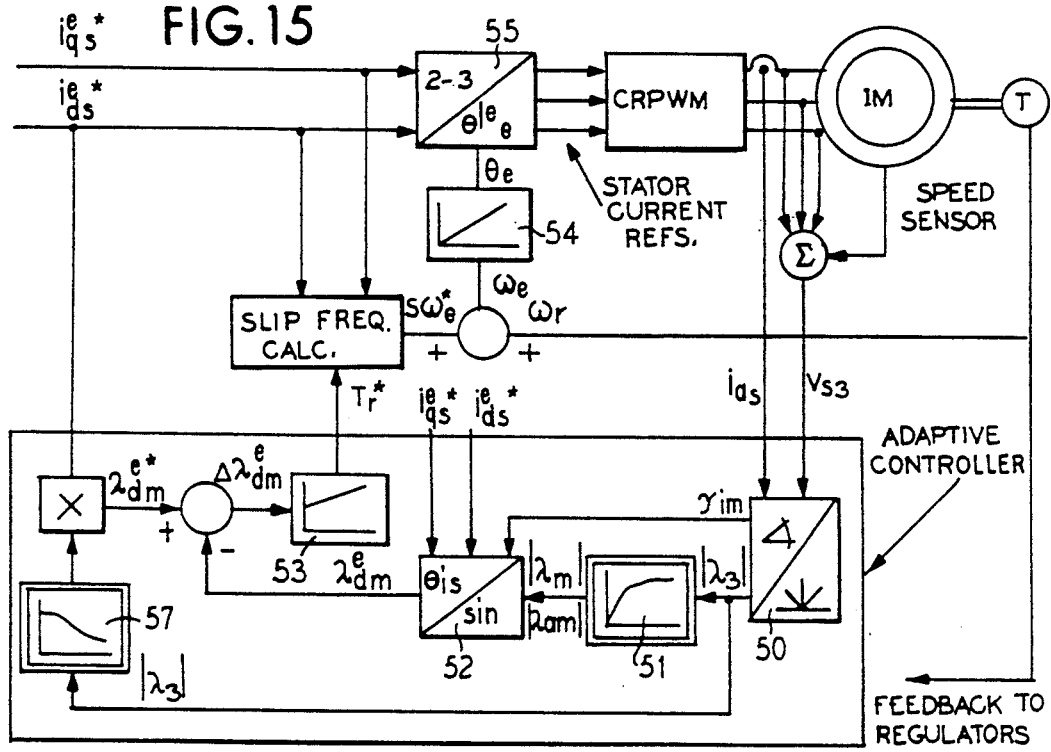
FIG. 15 shows in block diagrammatic view of an embodiment of model reference adaptive controller for implementation of a rotor time constant correction scheme with magnetizing inductance based on the amplitude of the third harmonic voltage signal.

This function relating $L_m$ and $|\lambda_3|$ is optionally but preferably incorporated in the MRAC controller in FIG. 14, which is easily accomplished, and the resulting adaptive control scheme becomes independent of variations in the magnetizing inductance. FIG. 15 shows an embodiment of such an IFOC MRAC-type controller for correcting the rotor time constant which incorporates this function.

The performance of the MRAC is demonstrated by plots which show the steady state value of the normalized d-axis component of the air gap flux as a function of the normalized detuning of the rotor time constant for Motor #3, which is characterized below. These quantities are normalized with respect to the values at ideal field orientation condition. Plots for three different values of torque at rated flux were prepared. The results shown demonstrate that the correct value of rotor time constant is always obtained because the $\lambda^e_{dm}$ is not a doubly valued function and because it presents a zero flux error at the correct rotor time constant for all torque conditions. These results also demonstrate that the controller is always stable regarding the direction of change in the rotor time constant.

A possible potential problem for this MRAC-type of controller is its low sensitivity to detuning for low torque conditions. The results of the indicated performance evolution suggest that a low sensitivity to detuning exists when the exemplary machine is running at 10 percent of its rated torque. This could perhaps represent a problem if a correct tuning is desired when operating at light load conditions. A solution for this potential problem is to increase the controller gains which should be done with caution in order not to compromise the dynamic response capability of the entire system of which this controller is a part.

The dynamic response capability of the MRAC is also sensitive to the operating conditions of the system. The simulation results obtained in evaluation of an embodiment of the MRAC show that the MRAC response is a function, for instance, of the direction of change in the rotor time constant. This type of behavior can be explained by the fact that the MRAC, which is implemented with constant controller gains, is actuating in a non-linear system. Consequently, the eigenvalues of the system including the MRAC controller are space variant, changing as the operating conditions of the drive are changed.

Despite these potential problems with sensitivity and variant dynamics, the MRAC presents the very attractive characteristic of being practically independent of machine parameters. The only machine-derived data desirable for its implementation is the function $f_{Lm}$ relating the magnetizing inductance and the amplitude of the third harmonic of the air gap flux. The result is a controller with high reliability. Evaluation results have shown that the MRAC is capable of estimating the correct optimum air gap flux value for a wide range of rotor speeds.

In most practical applications, the detuning of the slip calculator is a result of changes in the rotor resistance which has a thermal time constant that is much larger than any relevant electrical or mechanical time constants in the system. As a result, the variant dynamic response of the MRAC is not necessarily an issue with which to be concerned if stability is guaranteed. Furthermore, in applications where the motor operates close to its rated torque during most of the operating cycle, the potential problem of low sensitivity presented by this controller is not important.

The FPFC generates a rotor flux error which is used as a feedback signal to the controller while the slip frequency calculator generates the feedforward input signal. A principal operational feature of the FPFC is the way in which the error in the rotor flux is related to the error in the slip gain when detuning occurs. The two rotor flux components are affected by any amount of detuning due to changes in the machine parameters, and this error is used to predict the change that occurs in the machine parameters. The derivation for the relationship between the rotor flux error and the changes in the machine parameters follows.

The q-axis rotor voltage can be written as:

$$0 = r_r i_{qr}^e + p\lambda_{qr}^e + \omega_s \lambda_{dr}^e \qquad (11)$$

Considering that the detuning is mainly caused by changes in the rotor resistance which occur at a slow rate, the assumption can be made that the term $p\lambda_{qr}^e$ is close to zero. Hence, the foregoing equation above can be rewritten as:

$$0 = r_r i_{qr}^e + \omega_s \lambda_{dr}^e \qquad (12)$$

The q-axis rotor for flux a non-saturated machine is given by:

$$\lambda_{qr}^e = L_m i_{qs}^e + L_r i_{qr}^e \qquad (13)$$

The slip frequency $\omega_s$ from Eq. (12), after substituting $i_{qr}^e$ therewith from Eq. (13), is given by:

$$\omega_s = \frac{L_m}{T_r} i_{qs}^e \lambda_{dr}^{e-1} - \frac{1}{T_r} \lambda_{qr}^e \lambda_{dr}^{e-1} = m i_{qs}^e \lambda_{dr}^{e-1} - n \lambda_{qr}^e \lambda_{dr}^{e-1} \qquad (14)$$

where "$-1$" denotes the inverse of a quantity.

With the machine operating under field orientation, the commanded slip frequency $\omega_s^* = \omega_s$, and the estimates of m and n coincide with the actual values for m and n in the Eq. (14) above, as shown by:

$$\omega_s^* = \hat{m} i_{qs}^e \lambda_{dr}^{e-1} \qquad (15)$$

where the q-axis component of the rotor flux is zero and $\hat{m}$ is an estimate of m.

When a detuning occurs, an error in the parameter estimates appears as well as in the rotor flux components, such that the slip frequency, after identifying the terms that correspond to the definition for $\omega_s$ can be written as:

$$0 = \Delta m \lambda_{dr}^{e*-1} i_{qs}^e - \hat{m} \Delta \lambda_{dr}^{e-1} i_{qs}^e - \hat{n} \lambda_{dr}^{e*-1} \Delta \lambda_{qr}^e \qquad (16)$$

Assuming that the actual stator currents follow exactly the references, the division of Eq. (16) by Eq. (15) yields an expression for the error in the slip gain as a function of the error in the rotor flux components, as follows:

$$\frac{\Delta m}{\hat{m}} = \frac{\Delta \lambda_{dr}^e}{\lambda_{dr}^e} + \frac{\Delta \lambda_{qr}^e}{\hat{L}_m i_{qs}^{e*}} \qquad (17)$$

Alternatively, the expression for $\Delta m$ above is expressible in terms of the actual d-axis rotor flux instead its reference value:

$$\frac{\Delta m}{\hat{m}} = \frac{\Delta \lambda_{dr}^{e-1}}{\lambda_{dr}^{e-1}} + \frac{\Delta \lambda_{qr}^e}{\hat{L}_m i_{qs}^{e*}} \qquad (18)$$

As a result, the deviation in the parameter estimation represented by $\Delta m$ is readily computed as a function of the error in the d and q components of the rotor flux. This error is used by a controller algorithm to compute the necessary change in the slip gain commanded to the slip frequency calculator. When $\Delta m$ is added to the estimate $\hat{m}$, Eq. (15) yields:

$$\omega_s^* = (\hat{m} + \Delta m) i_{qs}^{e*} \lambda_{dr}^{e*-1} = (K_s^* + \Delta K_s) i_{qs}^{e*} \qquad (19)$$

where the symbol $K_s^*$ is the rated slip gain computed from Eq. (20), and $\Delta K_s$ is its variation obtained from Eq. (18):

$$K_s^* = \hat{m} \lambda_{dr}^{e*-1} = \frac{L_m}{T_r^*} \frac{1}{\lambda_{dr}^{e*}} \qquad (20)$$

The rotor flux used in Eq. (18) to compute the error in the slip gain error is estimated from a processing of the third harmonic voltage signal. As explained previously herein, the third harmonic stator voltage signal and one of the stator currents are used to estimate the air gap flux d and q components. The rotor flux is then readily computed from these quantities according to:

$$\lambda_{qr}^e = \frac{\hat{L}_r}{\hat{L}_m} \lambda_{qm}^e - \hat{L}_{lr} i_{qs}^e \qquad (21)$$

$$\lambda_{dr}^e = \frac{\hat{L}_r}{\hat{L}_m} \lambda_{dm}^e - \hat{L}_{lr} i_{ds}^e \qquad (22)$$

Although dependent on machine parameters, the rotor flux is obtainable with reasonable accuracy since the rotor leakage inductance, $L_{lr}$ and the ratio $L_r/L_m$ are only moderately dependent on the saturation level. The rotor flux references needed in the computation of the flux error are simply defined as zero for the q-axis component, and as a constant value for the d-axis component. This last value can be originated from a flux regulator, if desired.

Figure 16:
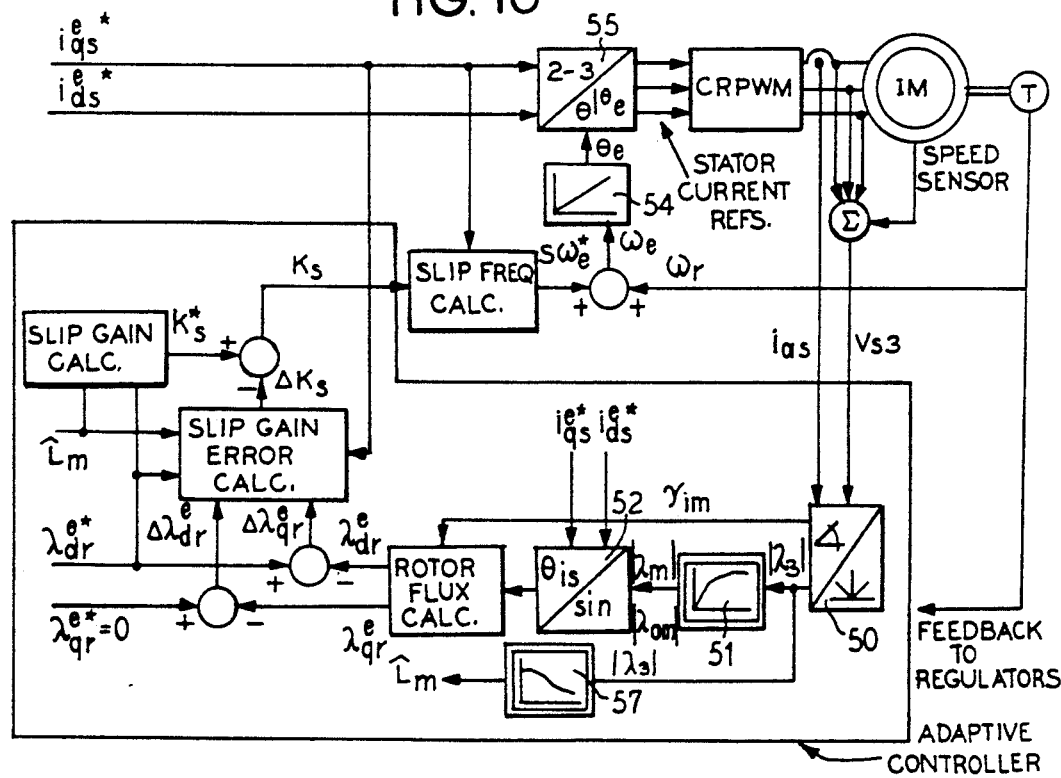
FIG. 16 shows a block diagrammatic view of a feedforward/predictive feedback controller using the rotor time constant with the magnetizing inductance estimate based on the amplitude of the third harmonic voltage signal.

FIG. 16 illustrates an embodiment of an FPFC implemented in an induction machine indirect field orientation system. As for the case of a MRAC, the estimate for the magnetizing inductance is obtained from the amplitude of the third harmonic flux signal. The presence of a feedforward and a feedback loop is apparent from this Figure.

Evaluation results demonstrating an implementation of the FPFC adaptive controller of this invention have been obtained. The induction machine described below as Motor #3 was chosen for these evaluation which included a simulation procedure.

A simulation program was developed as a tool to help in the design and the implementation of an adaptive controller of this invention. Neither speed nor position feedback control was assumed, so that the effects of detuning in the torque response were fully investigated.

Typical simulation traces obtained for Motor #1 were generated. The results included a constant and a rated flux command, and a step increase in the actual rotor resistance of 100 percent from its nominal value. Each set of imposed conditions dealt with a different value of torque command. The changes in the response dynamics of the controller were evident. The results included a rated torque condition, and conditions for 50 percent and 10 percent of that condition. The simulation results show the evolution for each of $T_r^*$, $\lambda_{dm}^e$, $\Delta\lambda_{dm}^e$, $\lambda_{qr}^e$, and $T_e$, which are, respectively, the rotor time constant, d-axis component of the air gap flux, error in the air gap flux d-axis component, rotor q-axis component, and electromagnetic torque. The traces showed the transient for an increase of 100 percent in the rotor resistance occurring at 0.5 seconds after the beginning of the plot.

The results demonstrated that the machine was working essentially under a field orientation condition up to the instant when the disturbance occurs in the rotor resistance. As soon as the disturbance occurs, the rotor and the air gap flux increased as a consequence of the over excitation produced by the increase in the rotor resistance. The adaptive controller then commanded the rotor time constant to change its new value while driving the air gap magnetic flux error to zero.

The differences in the dynamic response for each case are clearly shown by these results. In particular, the error magnitude of the d-axis component of the air gap flux reduced as the torque command current $i_{qs}^{e*}$ was reduced. Such behavior is characteristic for the MRAC. An indirect rotor flux orientation scheme was implemented using the Motorola DSP 56001 development system. The hardware associated with the DSP was similar to that utilized in the implementation of the efficiency maximizer controller described herein. An Electrocraft converter was modified to operate as a current source PWM inverter. A simple hysteresis regulator was digitally implemented to provide the current regulation for the three stator currents.

The motor used was a wound rotor three-phase induction type as described below. It was mechanically coupled to a direct current dynamometer at one end of the shaft, and to an incremental encoder with a resolution of 1,024 pulses per revolution at the other end. An external three phase resistance bank was connected to the rotor terminals so that the actual rotor resistance could be increased to about twice its nominal value.

The design and implementation of the control software in the DSP 56001 was straightforward. The software program consisted of a single loop (no external or timer interrupts were used) that was controlled to run every 100 μs. During each run, two stator current signals and the third harmonic voltage were input into the processor.

An integration of the third harmonic voltage signal was performed so that the third harmonic flux was obtained. The amplitude of this flux component was detected, and the amplitude of the fundamental flux was read from a reference table containing the function $f_\lambda$ in Eq. (3). The angle which the current in phase makes as it crosses zero was detected and a flag was kept set until the next crossing for the third harmonic flux was also detected. The subtraction of the two angles yielded the angle $\gamma_{im}$. Zero crossing detection for measuring $\gamma_{im}$ is preferred to the method above described and used in efficiency control because the current and third harmonic signals present less noise in this application than in the case where the motor is driven by a PWM voltage source inverter. Another factor is that the zero crossing angles for current and third harmonic flux are readily available from the synchronous angle $\theta_e$ computed to be used in the reference frame transformation for the stator currents.

Next, the d-axis component of the air gap flux was computed according to Eq. (1). An error signal was then generated from this signal, and its reference value was obtained from the current command $i_{ds}^{e*}$ and a reference table containing the function $f_{Lm}$ as in Eq. (10). A proportional-integral regulator was implemented in order to drive the flux error to zero by changing the rotor time constant estimate $T_r^*$.

The digital implementation of the FFPC has the same basic structure as the implementation of the MRAC described above. In the FFPC controller, the rotor flux d and q components were computed from the corresponding components of the air gap flux and stator current according to Eq. (21) and Eq. (22). The rotor flux references are assumed to be constants computed aside from the controller. The equation for the prediction estimator of the error in the slip gain (Eq. 17) is implemented, and the correct slip gain computed.

The third harmonic stator voltage signal obtained from the summation of the three phase voltages for operation at no load and synchronous frequency around 30 Hz was evaluated. A current regulated PWM inverter was used to supply the induction machine. The summation produced a third harmonic voltage. The switching frequency component in the third harmonic voltage was easily eliminated by a low pass filter (LPF). Another LPF was preferably used for the current so that the phase displacement between the current and third harmonic voltage was kept exactly at its original value. Points corresponding to the maximum values for the air gap flux and the current are easily identified since the zero crossing for the voltage waveform corresponds to a maximum value for the flux.

For a no-load condition, the phase shift between these two points, which represents the phase shift between the fundamental components of air gap flux and stator mmf, was very small since the mechanical output power developed is only sufficient to overcome the windage and friction losses. As the machine was loaded, this phase shift increased to respond to the mechanical torque required by the load. This signal particularly when filtered was found to be very suitable for analog or digital processing.

The spectrum content of the third harmonic stator voltage signal was analyzed. After the summation of the three phase voltages, all the polyphase components were eliminated and the third harmonic was found to be clearly the dominant component at the lower side of the frequency spectrum. The PWM inverter utilized for these measurements had a variable switching frequency (between 3 and 5 kHz) which can have an amplitude comparable to the amplitude of the third harmonic stator voltage signal, and such should, therefore, preferably be filtered.

The third harmonic voltage signal and the stator current for a condition of zero speed (locked rotor) was evaluated. The synchronous frequency, which for this case was around 0.6 Hz, corresponds to the slip frequency for a torque command of about 0.25 pu. The amplitude of the third harmonic voltage was very reduced, but a clear and measurable signal was obtainable. The induction machine in this case was commanded to operate with rated flux. The frequency spectrum for the third harmonic signal then produced, showed that high frequencies of the spectrum were eliminated by a LPF. Although the voltage was of small amplitude, the third harmonic flux had a considerable magnitude, and was capable of estimating the correct air gap flux.

The dynamics of the third harmonic signal illustrate the evolution of the stator current and of the third harmonic voltage, responsive to a step change in the torque command. The amplitude of the voltage dropped to zero as the frequency reached zero during the speed reversal. One could conclude that detection of the angle between the air gap flux and the stator mmf is difficult to identify when such transients occur.

The relationship between the amplitude of the air gap fundamental flux component, $|\lambda_m|$, and the amplitude of the third harmonic flux component, $|\lambda_3|$, as obtained from the stator third harmonic voltage was evaluated. A reference table containing this function was used by the control software of both adaptive controller embodiments which as built were able to estimate the amplitude of the fundamental air gap flux.

The relation existing between the magnetizing inductance value and the amplitude of the third harmonic flux component was studied. These results were obtained for Motor #3 with a sinusoidal voltage supply at rated frequency and at no-load. This function, when implemented in the control software, allowed the estimation of the magnetizing inductance of the machine operating at different flux levels.

The operation of the MRAC in correcting variations of the actual rotor resistance for Motor #3 was evaluated and the performance verified. Rated torque and flux commands were used while the motor was loaded by a direct current dynamometer. A step change in the rotor resistance from nominal to twice nominal was applied to the motor by changing the external resistance connected to the rotor terminals. After the system response to this change, another step change was applied, so that the nominal rotor resistance was reestablished. Slip gain, error for the d-axis component of the air gap flux, the d-axis component of the air gap flux, and rotor speed were examined in a simultaneous time frame. The increase in the rotor resistance occurred at the first time division when a change in the speed and flux components occurred. After approximately 10 seconds, the error in flux was reduced to zero as the d-axis component of the air gap flux returned to its original value prior to the disturbance. The MRAC then commanded a slip gain twice as large as its nominal value, so that the motor kept the condition of field orientation and speed and torque returned to their original values.

It was clear that the correction action of the adaptive controller has different dynamics when the rotor resistance was decreased to its nominal value. The error in flux was larger when the rotor resistance gets lower than its estimate. The non-linear behavior of the system was also made clear by the type of response achieved to a reduction of the rotor resistance. The system in this case was able to correct the slip gain in about 2 seconds, and almost no speed transients were observed.

The same variables as previously identified were employed for a condition of 50 percent of torque and rated flux commands. A difference in the dynamic responses for these two respective operation conditions was observed. At half rated torque, the flux error had a somewhat lower magnitude than the error in the rated torque. The response time for the controller to achieve the correct slip gain was somewhat shorter than for the half loaded case. The disturbance of the speed was considerably less than in the previous MRAC operation.

Evaluation results for the FPFC were also obtained from a constructed system. The slip gain, the q-axis component of the rotor flux, the d-axis component of the rotor flux, and mechanical speed were studied in a simultaneous time frame. These data were taken for Motor #3 running at rated torque and rated flux. As in the previous case, the motor was coupled to a dynamometer. Again, the rotor resistance was doubled initially and then had its value returned to the nominal value (both step changes). The correction for the slip gain was very fast, taking less than two seconds for the controller to command the correct slip gain. As before, the response of the system for the two changes of the rotor resistance was different. This difference, as in the case for the MRAC, is a consequence of the non-linearity introduced into the controller when the rotor resistance changes.

The independence of the controller response with changes in the operating condition of the machine was verified from the data obtained which showed the same changes in the rotor resistance as in the preceding case, but at a condition of rated flux and 50 percent of torque. The response dynamics were only slightly changed from the constructed FPFC system.

Adaptation of the slip gain at zero speed (locked rotor) was possible with the FPFC as the data showed for a condition where Motor #3 was driven at rated torque and at rated flux values. The same variables as indicated above were used for the same amount of change in the rotor resistance as for the above cases.

The FPFC system has an excellent response characteristic which is better than that achieved by the MRAC operating at the same conditions. The observed results demonstrate that the third harmonic component of the stator voltage signal is utilizable for accurately estimating the rotor flux even at zero speed.

The error generated in the rotor flux components and the type of responses achieved in this operating condition were essentially the same as for the case shown in the constructed FPFC system described above.

Thus, the MRAC corrects the rotor time constant from the error in the d-axis component of the air gap flux while the FPFC eliminates rotor flux disturbances by commanding the correct slip gain which is predicted from previous states of the machine.

The stator voltage third harmonic component is used to determine the resulting position and amplitude of the fundamental component of the air gap magnetic flux, and this air gap flux is resolved into its d-axis and q-axis components. The d-axis component of the flux is then used in the MRAC as a control signal for the adaptation of the rotor time constant. The FPFC requires computation of the rotor flux which is accomplished from the air gap flux and stator current components. These two control implementations each require a knowledge of the machine magnetizing inductance which cannot be considered a constant under practical circumstances. Therefore, a correction strategy for changes in the magnetizing inductance occurring with flux level is preferably implemented in both controllers. This correction strategy is based on a function relating the value of the inductance with the amplitude of the third harmonic flux signal.

From the evaluation results, it is concluded that the FPFC type of controller has a somewhat better performance at low speed than the MRAC; thus; even for zero speed, it works very well. Its response, however, to disturbances occurring at low levels of torque is not significantly better than for the MRAC-type of controller.

Dependence on the machine saturation level is a characteristic of both these two IFOC controller embodiments since they work properly only if a third harmonic stator voltage is produced by the saturation of the stator and rotor teeth. At reduced flux levels, the third harmonic signal becomes small and eventually disappears. The range of flux in which these controllers can be utilized is a function of the design of the motor being used. High efficiency motors, for instance, are designed to operate with reduced flux levels, and lower third harmonic voltages are expected.

The present invention can also provide a direct field orientation controller for induction machines which utilizes the localization of the air gap flux from the third harmonic voltage component of the stator phase voltages.

This controller utilizes the circumstance that space saturation harmonic components, rotating at synchronous frequency, are generated in the air gap flux when the induction machine operates under saturation conditions. These flux harmonic components are responsible for induction of stator phase voltages, and when the machine is wye connected, the sum of the three phase voltages results in a signal dominated by the third harmonic and a high frequency component due to the above described rotor slot ripple. Two controller embodiments for locating the rotor flux from the third harmonic voltage signal for the purpose of achieving rotor field orientation are provided.

Determination of the absolute position of the air gap or rotor flux from the third harmonic component of stator voltage presents the problem that the third harmonic signal gives information about only one of the flux components (either the d or the q component). Two methods for rotor field orientation are here provided which circumvent this problem.

The first method computes the absolute position from the third harmonic signal with the use of a quadrature oscillator, or the like. The second method achieves rotor field orientation by forcing the alignment of the rotor flux with the d-axis of the d-q plane defined by the stator current components.

This second method is implemented in a simulation and the results demonstrate that the system torque response for transient and steady state regimes are adequate for this low cost implementation solution of direct field orientation control.

With the phases of the induction motor connected in star without a neutral connection, no zero sequence components (triple harmonics in a three phase system) will exist in the current. As discussed above, a function relating the third harmonic stator voltage and the air gap voltage has been discovered and it is used to determine the fundamental air gap flux linkage of the machine, $\lambda_m$.

Computation is necessary in order to obtain the rotor flux from the air gap flux, as described by Eqs. (21) and (22) above. These equations are written in the synchronous reference frame which is the reason for the superscript e. Although dependent on machine parameters, the rotor flux can be obtained with reasonable accuracy since the rotor leakage inductance, $L_{lr}$, and the ratio $L_r/L_m$ are only moderately dependent on the saturation level. Therefore, the rotor flux d-q components are readily obtained from a knowledge of the stator current components, the air gap flux, which is measured from the stator third harmonic signal, and the motor inductance parameters.

A practical problem which arises when implementing the rotor flux orientation control scheme comes from the fact that the air gap flux is not absolutely located by the third harmonic voltage signal which comprises information concerning only the sine or cosine component of the air gap flux (the d or the q component). Therefore, it is necessary to extend the control methodology to obtain the two quadrature components of the air gap flux.

Figure 17:
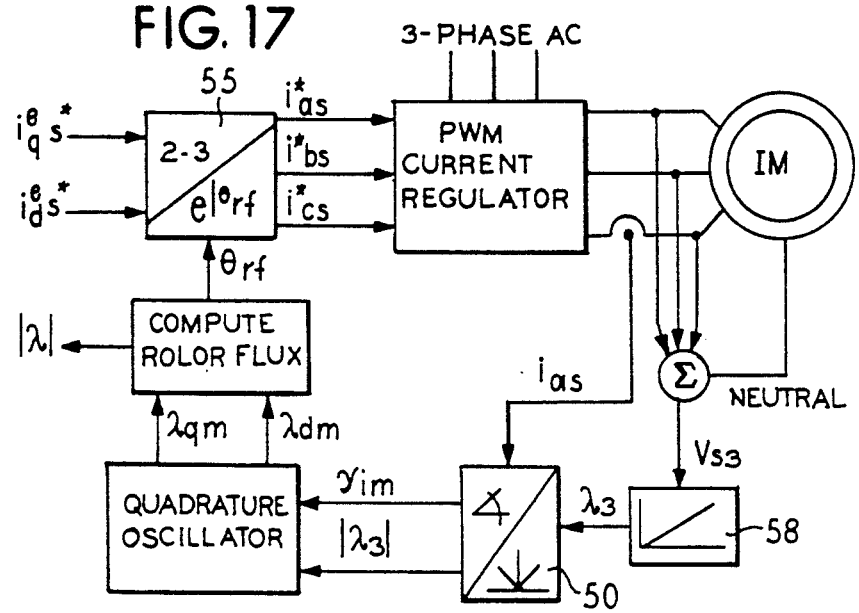
FIG. 17 shows a block diagrammatic view of a direct rotor field orientation controller using a scheme of locating the absolute position of the rotor flux from the third harmonic voltage signal.

As FIG. 2 shows, the air gap fundamental and third harmonic components together with one of the stator line currents for a loaded motor are interrelated. Clearly point P in the third harmonic wave locates the maximum of the fundamental component of the air flux (point A) which can then be referred to the stator current maximum value (point C) by the angle displacement $\gamma_{im}$ (see FIG. 3). Hence, by detecting point A and measuring the angle $\gamma_{im}$, the absolute position of fundamental air gap flux component is known. A quadrature oscillator is constructed or purchased commercially and synchronized to the point P (see FIG. 2) in the third harmonic voltage signal by means of the angle $\gamma_{im}$. Therefore, from the third harmonic voltage signal, $v_{s3}$, one can readily obtain sine and cosine signals whose angles, $\theta_{is}$ and $\gamma_{im}$, correspond to the instantaneous position of the air gap flux $\lambda_3$. The rotor flux is then determined as in Eqs. (21) and (22) and a direct rotor field orientation controller shown in block diagrammatic form in FIG. 17 can be implemented.

In this controller, the third harmonic flux signal is obtained from the third harmonic voltage signal by means of a conventional integrator. This signal together with the stator current allows the measurement of the angular displacement $\lambda_{im}$. The amplitude of the third harmonic flux component and the angle $\lambda_{im}$ are the input signals to the quadrature oscillator which generates the d and q components of the fundamental air gap flux.

Another controller embodiment which solves the problem of locating the rotor flux from the third harmonic air gap flux involves the relative positions of the stator current, the air gap flux, and the rotor flux vectors, as shown in FIG. 3. When such vectors are in the synchronous reference frame, they can be interpreted as phase quantities. Given the current commands $i_{qs}^{e*}$ and $i_{ds}^{e*}$, the current vector amplitude $i_s$ and the angle $\theta_{is}$ are computed. With the angle $\gamma$ defined and measured as indicated in FIG. 3, the air gap flux components are determined from the Eq. (4) and $$\lambda_{qm}^e = |\lambda_m| \cos(\theta_{is} + \gamma_{im}) = f_\lambda(|\lambda_3|) \cos(\theta_{is} + \gamma_{im}) \quad (23)$$

where $f_\lambda$ is the function relating the amplitudes of the fundamental and third harmonic as above discussed herein (see FIG. 3). The rotor flux components are then obtained from these equations and the stator current components are obtained from the Eqs. (21) and (22).

In rotor field orientation condition, the rotor flux is aligned with the d-axis when the q-axis rotor flux component and the rotor flux angle $\gamma_{im}$ as shown in FIG. 3 become zero. The rotor flux orientation is then achieved by driving, for instance, the rotor flux angle $\gamma_{im}$ to zero by controlling the synchronous frequency, $\omega_e$, applied to the transformation of the stator reference currents from the synchronous to the stationary reference frame. Changes in this frequency accelerate or decelerate the current vector If such that the rotor flux angle $\gamma_{im}$ is driven to zero. Moreover, since the d and q-axis are fixed in the current components, driving the rotor flux angle $\gamma_{im}$ to zero has the same effect as orienting the rotor flux with respect to the d-axis which is the objective for achieving rotor field orientation.

As for the present control methods, a non-ideal torque response is characteristic for both controllers since delays in computing the air gap flux amplitude, and in the angle between current and flux are unavoidable. The first method identified hereinabove presents more delays than the second method due to the time constants associated with the quadrature oscillator utilized to generate the absolute position of the rotor flux.

Figure 18:
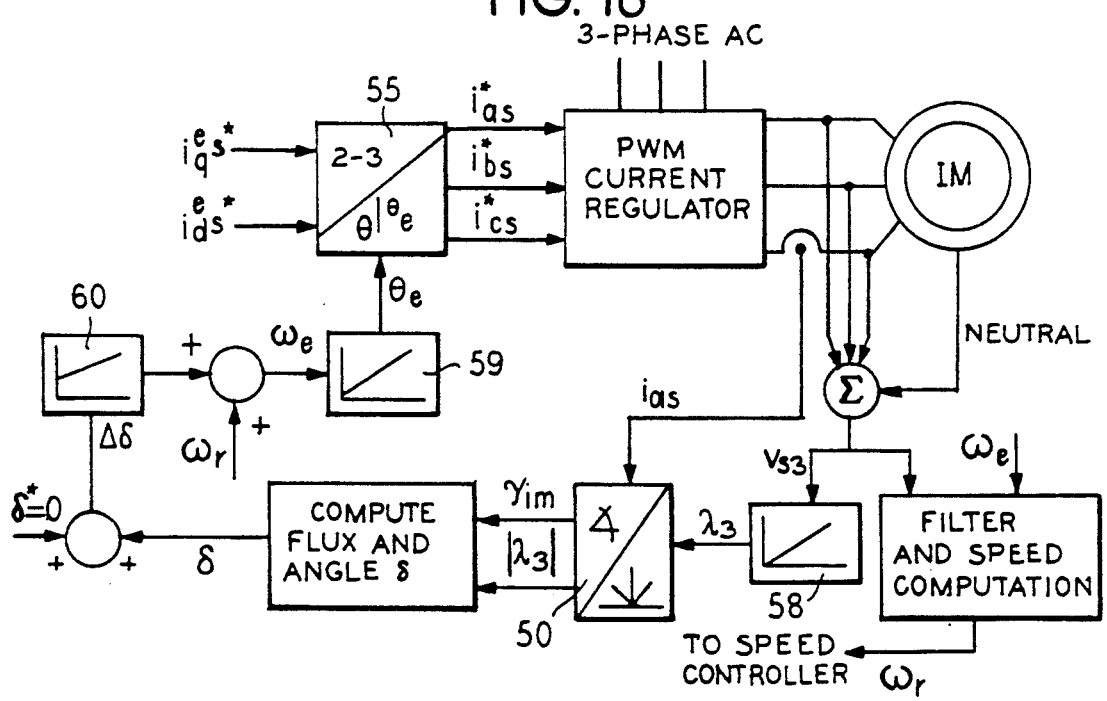
FIG. 18 shows a block diagrammatic view of a direct rotor field orientation control implementation system for driving the rotor flux angle $\gamma$ to zero.

A presently preferred controller embodiment is shown in FIG. 18. A proportional-integral regulator is used to drive the error in the rotor flux angle, $\Delta\gamma_{im}$, to zero. The output of the regulator is added to the mechanical speed generating the synchronous frequency which is integrated to generate the angle $\theta_e$ used in the transformation of the stator current references. The output of the regulator can be viewed as a slip frequency value.

Speed control can be implemented without the need of an external speed sensor, as shown in the FIG. 18 embodiment. The rotor slot ripple signal, $v_{slot}$, which modulates the third harmonic voltage signal, is isolated from it by means of a band pass filter having a variable center frequency. A switched capacitor filter controller by the synchronous frequency $\omega_e$ is utilized for this end, with the speed of the machine being given by the expression:

$$\omega_r = \frac{\omega_{slot} - \omega_e}{n_r} \quad (24)$$

where
$\omega_r$ = rotor speed in electrical rad/s,
$\omega_{slot}$ = slot ripple frequency in rad/s, and
$n_r$ = number of rotor bars.

The direct field oriented controller presented in FIG. 16 is implemented in a digital simulation program. The results shown here are obtained for Motor #1 driving a load with twice the motor inertia. The spectrum components from the third harmonic stator voltage signal were obtained when the machine is driven by a current regulated (PWM) pulse width modulator inverter. From that data it was verified that the third harmonic is the dominating component followed by the inverter switching frequency and rotor slot ripple.

Simulation results from the direct rotor field orientation controller proposed in FIG. 18 for the torque current component, $i_{qs}^{e*}$, torque, rotor q-axis component, and the rotor flux angle $\gamma_{im}$ were obtained. It was found that the system transient behavior is very good, especially with regard to the torque transient response. In this simulation, the rotor angle was driven to zero within about 0.3 seconds after the change in the torque command. This time was approximately the time required for the torque to reach the correct value when the machine regains the condition of rotor flux orientation.

Thus, a simple, low cost controller for induction machine field orientation control is provided which utilizes the locating of the air gap flux from the third harmonic voltage component induced in the stator phase voltages when the machine is under saturation condition. When the stator phase voltages are summed, the resultant signal contains a dominant third harmonic component followed by the rotor slot ripple which is usable for purposes of speed control.

Two embodiments utilizing the third harmonic voltage signal are provided. The first one uses the third harmonic signal to locate the air gap flux position in absolute terms which is somewhat difficult to achieve due to the fact that no quadrature signal is directly obtainable from the third harmonic signal. The second one avoids the problem of finding the absolute rotor flux position by driving the rotor flux angle with respect to the d-axis to zero, thereby achieving the rotor field orientation condition. Limitations in the torque transient response exist due to the delays introduced by the computation of the flux amplitude and angle measurement. The second method is preferred because of its simplicity and less delay.

In FIGS. 14 through 18, the following legends are used:

| Block No. | Block Function |
|---|---|
| 50 | Computer computes the angle $\gamma_{im}$ and the value of $|\lambda_3|$. Can contain a comparator of $i_{as}$ and $v_{s3}$ to measure $\gamma_{im}$. Can also contain a filter and integrator for $v_3$ so that $|\lambda_3|$ can be computed. |
| 51 | Computer computes function $f_\lambda$ implemented through an incorporated reference table. |
| 52 | Computer computes angle $\theta_{is}$ and sin $(\theta_{is} - \gamma_{im})$. |
| 53 | Flux regulator can be a PI controller implemented in software. |
| 54 | An integrator can compute angle $\theta_e$ from $\omega_e$ where: |
| (25) | $\theta_\theta = \int \omega_\theta dt$ |
| 55 | Computer accomplishes the transformation of variables from d-q synchronous reference frame to phase variables in abc reference frame. |
| 56 | Reference base. Supplies value of magnetizing inductance. |
| 57 | Computer. Calculates the value of $f_{Lm}$ as implemented with a reference table so that Lm* is computed from $|\lambda_3|$. $f_{Lm}$ is measured experimentally from the function $f_\lambda$. The magnetizing inductance is computed for each value of $|\lambda_m|$ and $|\lambda_3|$ from a reference table wherein such values are referenced to values for $|\lambda_3|$. |
| 58 | An integrator. Integrates $v_{s3}$ to produce $\lambda_3$. |

-continued

| Block No. | Block Function |
|---|---|
| 59 | An integrator. Integrates $\omega_e$ to produce $\theta_e$. |
| 60 | A regulator. Can be a PI controller implemented in software. |

EXAMPLE 3

The following equipment was utilized in the exemplary embodiments above described and evaluated.

1. Motor #1 was rated at 3.0-hp (horsepower) and was obtained from U.S. Electrical Company. Data on this motor is as follows:

TABLE A-1

| DATA FOR MOTOR #1 | | |
|---|---|---|
| Quantity | Symbol | Value |
| Line Voltage | Vl | 220 V rms |
| Output Power | $P_o$ | 3.0-hp |
| Speed | $\omega_r$ | 1740 rpm |
| Poles | P | 4 |
| Frame | — | 182T |
| Stator resistance | $r_s$ | 1.11 Ω |
| Rotor resistance | $r_r$ | 0.47 Ω |
| Stator leakage reactance | $X_{Ls}$ | 1.05 Ω |
| Rotor leakage reactance | $X_{Lr}$ | 1.05 Ω |
| Unsaturated magnetizing reactance | $X_m$ | 22.09 Ω |
| Rotor inertia | $J_m$ | 0.0104 Kg-m² |
| Number of rotor slots | $n_r$ | 46 |
| Number of stator slots | $n_s$ | 36 |
| Air gap length | $g_o$ | 0.4165 mm |
| Rotor skew | — | 1 slot |
| Stator pole pitch | — | 7/9 |
| Rotor stack length | $l_m$ | 65.40 mm |

2. Motor #2 was rated at 7.5-hp and was obtained from Baldor Company. Data on this motor is as follows:

TABLE A-2

| DATA FOR MOTOR #2 | | |
|---|---|---|
| Quantity | Symbol | Value |
| Line Voltage | Vl | 230 V rms |
| Output Power | $P_o$ | 7.5-hp |
| Speed | $\omega_r$ | 1750 rpm |
| Poles | P | 4 |
| Frame | — | 924M |
| Stator resistance | $r_s$ | 0.210 Ω |
| Rotor resistance | $r_r$ | 0.193 Ω |
| Stator leakage reactance | $X_{Ls}$ | 0.698 Ω |
| Rotor leakage reactance | $X_{Lr}$ | 0.698 Ω |
| Unsaturated magnetizing reactance | $X_m$ | 16.95 Ω |
| Rotor inertia | $J_m$ | 0.041 Kg-m² |
| Number of rotor slots | $n_r$ | 48 |
| Number of stator slots | $n_s$ | 36 |
| Air gap length | $g_o$ | 0.558 mm |
| Rotor skew | — | none |
| Stator pole pitch | — | 7/9 |
| Rotor stack length | $l_m$ | 79.91 mm |

3. Motor #3 was rated at ⅓-hp and was obtained from Wagner-Leland. Data on this motor is as follows:

TABLE A-3

| DATA FOR MOTOR #3 | | |
|---|---|---|
| Quantity | Symbol | Value |
| Line Voltage | Vl | 220 V rms |
| Output Power | $P_o$ | 1/3-hp |
| Speed | $\omega_r$ | 1725 rpm |
| Poles | P | 4 |
| Frame | — | 56T60 |
| Stator resistance | $r_s$ | 7.15 Ω |
| Rotor resistance | $r_r$ | 6.0 Ω |
| Stator leakage reactance | $X_{Ls}$ | 5.14 Ω |
| Rotor leakage reactance | $X_{Lr}$ | 3.23 Ω |
| Unsaturated magnetizing reactance | $X_m$ | 100.65 Ω |
| Rotor inertia | $J_m$ | 0.022 Kg-m² |
| Number of rotor slots | $n_r$ | 33 |
| Number of stator slots | $n_s$ | 36 |
| Air gap length | $g_o$ | 1.28 mm |
| Rotor skew | — | 1 slot |
| Stator pole pitch | — | 7/9 |
| Rotor stack length | $l_m$ | 46.18 mm |

4. The inverter characteristics are as follows:

| Characteristics | Value |
|---|---|
| Manufacturer - Emerson Industrial Controls Model - Laser 1 series | |
| Chassis part number | 2950-8402 |
| Input ac max. voltage | 480 V |
| Input ac max. current | 47.8 A |
| Output ac max. voltage | 460 V |
| Output ac max. current | 30.2 A |
| Output frequency | 6-120 Hz |
| Output power | 20-hp |
| Switching frequency | 1.2-2.0 kHz |

Although the invention has been described with reference to particular embodiments, it should be understood that many variations and modifications will be apparent to those skilled in the art. The scope of this invention is not limited by the foregoing specific embodiments.

What is claimed is:

1. A method of controlling the torque of an operating multiple phase induction motor having rotor means, stator means and an air gap therebetween comprising the steps of:

a) determining the third harmonic component of stator voltage and calculating the third harmonic component of air gap flux from said third harmonic component of stator voltage;

b) measuring the amplitude of a representative stator current;

c) measuring the phase angle between the fundamental component of said stator current and said third harmonic component of air gap flux;

d) determining the fundamental air gap flux and its magnitude from said third harmonic component of air gap flux;

e) calculating the rotor flux position and amplitude parameters from said fundamental air gap flux;

f) calculating a slip gain error from said rotor flux parameters;

g) calculating a correct slip gain based on said slip gain error; and h) controlling the input slip frequency to said motor based on said correct slip gain using motor power voltage and input power frequency.

2. A method for controlling the rotor field orientation in an operating multiphase induction machine having stator means, rotor means and an air gap therebetween, said method comprising the steps of:

a) determining the third harmonic component of air gap flux from the third harmonic component of stator phase voltage;

b) determining the maximum value of the fundamental component of said air gap flux from said third harmonic air gap flux component;

c) measuring the phase angle between the maximum value of the stator current and the maximum value of said fundamental air gap flux component;

d) passing said phase angle and also the maximum value of said third harmonic air gap flux component through a quadrature oscillator means which produces direct and quadrature components of said fundamental air gap flux component;

e) computing the rotor flux from said direct and said quadrature components;

f) comparing said computed rotor flux to a reference motor flux, thereby generating a phase angle value which represents the difference between the fully oriented rotor field orientation and the actual rotor field orientation;

g) inputing said phase angle signal into a regulator means along with reference signals for said direct and said quadrature values of current being input into said machine, thereby generating current values for each phase of said machine; and h) charging said current values into a current regulator from which power is fed to said machine, thereby regulating input power to control said rotor field orientation.

3. An apparatus for controlling rotor field orientation in an operating multiphase induction machine having stator means, rotor means and an air gap therebetween, said apparatus comprising in combination:

a) means for determining the third harmonic component of air gap flux from the third harmonic component of stator phase voltage;

b) means for determining the maximum value of the fundamental component of said air gap flux from said third harmonic air gap flux component;

c) means for measuring the phase angle between the maximum value of the stator current and said maximum value of said fundamental air gap flux component;

d) means for passing said phase angle and the maximum value of said third harmonic air gap flux component through a quadrature oscillator means which produces direct and quadrature components of said fundamental air gap flux component;

e) means for computing the rotor flux from values for said direct and said quadrature components of said fundamental air gap flux component and for identifying rotor field orientation;

f) means for comparing said rotor flux to a desired rotor field orientation and for generating an output signal representation of such comparison; and g) means for regulating input current and frequency thereof to said machine, thereby to control rotor field orientation.

4. A method for correcting slip gain error in an operating multi-phase induction motor whose stator winding is connected to a power-providing inverter, said method comprising the steps of:

a) determining the third harmonic component of stator voltage by summing the stator voltage components and integrating said third harmonic component of stator voltage to calculate the third harmonic component of stator flux;

b) estimating the amplitude of the fundamental component of the air gap flux from (i) the characteristic relationship existing in said motor between the amplitude of said third harmonic component of said stator flux and said amplitude fundamental of said air gap flux, and (ii) the relative position with respect to the stator current as measured by the phase displacement between a first point which is along the waveform of said third harmonic component of said stator flux and which corresponds with the maximum value of said fundamental component of said air gap flux and a second point which is along the waveform of said stator current which corresponds with the maximum value of said stator current;

c) calculating each of the q-axis and the d-axis components of the rotor flux using q-axis and d-axis components of each of (i) the amplitude of said amplitude fundamental component of said air gap flux and (ii) said stator current;

d) comparing said q-axis and said d-axis components of said rotor flux with respective model reference values of said q-axis and said d-axis components of said rotor flux and calculating from the resulting difference values a slip gain error, said model reference values being selected from the rotor position;

e) calculating the reference slip gain from the reference values for each of (i) the q-axis value of said stator current and (ii) said d-axis value of said rotor flux;

f) comparing said slip gain error with the reference slip gain to produce the actual slip gain;

g) charging said actual slip gain, the rotor position, and each of said q-axis and said d-axis values of said stator current to an indirect field oriented controller and producing phased current outputs which are corrected for said slip gain error;

h) charging said corrected phase current outputs to a current regulated pulse width modulated inverter and generating currents and voltages which are corrected for said slip gain error; and i) powering said motor with said corrected currents and voltages.

5. The method of claim 4 wherein, in step (c), said calculating is carried out using the following relationships:

$$\lambda^e_{qr} = \frac{L_r}{L_m} \lambda^e_{qm} - L_{lr} i^e_{qs}$$

$$\lambda^e_{dr} = \frac{L_r}{L_m} \lambda^e_{dm} - L_{lr} i^e_{ds}$$

where:
$\lambda$ indicates flux,
$L_r$ indicates rotor self inductance,
$L_m$ indicates magnetizing inductance,
$L_{lr}$ indicates rotor leakage inductance,
i indicates current,
superscript e indicates synchronous reference frame,
subscript s indicates stator,
subscript q indicates q-axis,
subscript d indicates d-axis, and
subscript r indicates rotor.

6. The method of claim 4 wherein, in step (d), said slip gain error is so calculated using the following relationship:

$$\Delta K_s = \Delta m \times \lambda_{dr}^{e\,-1}$$

where

Δ indicates a variation in a quantity,
$K_s$ indicates slip gain,
m indicates machine parameters,
λ indicates flux,
subscript d indicates d-axis,
subscript r indicates rotor,
superscript e indicates synchronous reference frame, and
* indicates the reference value of an indicated variable.

7. An apparatus for on-line, feed forward correcting of the slip gain error in a continuously operating multiphase induction motor whose stator winding is connected to a power-providing inverter, said apparatus comprising in combination:
   a) means for determining the third harmonic component of stator voltage;
   b) means for estimating the amplitude of the fundamental component of air gap flux including a reference table interrelating for said motor the amplitude of the third harmonic component of the stator flux with said amplitude of the fundamental component of air gap flux and further including means for measuring the phase displacement between the point along the waveform of said third harmonic component of stator flux which corresponds with the maximum value of said fundamental component of air gap flux and the point along the stator current waveform which corresponds with the value thereof;
   c) means for calculating each of the q-axis and the d-axis components of each of the stator current and the fundamental air gap flux amplitude, and also for calculating from such components each of the q-axis and the d-axis components of the rotor flux;
   d) means for determining model reference values of said q-axis and said d-axis components from the rotor position and for comparing said q-axis and said d-axis components of said rotor flux with said respective model reference values;
   e) means for calculating the reference slip gain from said reference values for each of said q-axis value of the stator current and said d-axis value of the rotor flux;
   f) means for comparing the slip gain error with the reference slip gain to produce the actual slip gain;
   g) indirect field oriented controller means responsive to said actual slip gain, the rotor position, and each of said q-axis and said d-axis values of said stator current and productive of phased current outputs which are corrected for said slip gain error; and
   h) current regulated pulse width modulated inverter means responsive to said corrected phased current outputs and productive of current and voltage outputs which are corrected for said slip gain error.

8. A method for controlling torque by correcting slip gain error in an operating three phase, wye connected induction motor having rotor means, stator means, and an air gap therebetween, said motor being powered through a current-regulated inverter means, said method comprising the steps of:
   a) determining the fundamental component of the air gap magnetic flux by:
      (1) summing the stator phase voltages to produce resultantly the third harmonic component of stator voltage;
      (2) integrating said third harmonic component of stator voltage to produce the third harmonic component of said air gap magnetic flux; and
      (3) identifying the fundamental component of said air gap magnetic flux from said third harmonic component of said air gap magnetic flux;
   b) estimating information for the rotor flux position and amplitude;
   c) resolving said fundamental component of said air gap magnetic flux into its d-axis and q-axis components;
   d) comparing said d-axis and q-axis components to a field oriented reference model and calculating slip gain error;
   e) comparing said so calculated slip gain error to the calculated slip gain to produce an output signal;
   f) regulating an indirect field oriented controller with said output signal and with said rotor flux position information to produce a resultant signal;
   g) regulating phase voltages in said inverter by said resultant signal; and
   h) operating said motor from the voltage and the current outputs of said inverter.

* * * * *